US012249269B2

(12) United States Patent
Lee et al.

(10) Patent No.: US 12,249,269 B2
(45) Date of Patent: Mar. 11, 2025

(54) DATA DRIVER, DISPLAY DEVICE HAVING DATA DRIVER, AND ELECTRONIC DEVICE HAVING DATA DRIVER

(71) Applicant: Samsung Display Co., Ltd., Yongin-Si (KR)

(72) Inventors: Sangmin Lee, Yongin-si (KR); Se-Byung Chae, Yongin-si (KR); Subin Kim, Yongin-si (KR); Hyunchang Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/213,897

(22) Filed: Jun. 26, 2023

(65) Prior Publication Data

US 2024/0096266 A1 Mar. 21, 2024

(30) Foreign Application Priority Data

Sep. 21, 2022 (KR) ........................ 10-2022-0119654
Nov. 8, 2022 (KR) ........................ 10-2022-0147832

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2018/0047324 A1 2/2018 Tao
2020/0394967 A1 12/2020 Park et al.
2021/0366343 A1 * 11/2021 Oh ....................... G09G 3/3291

FOREIGN PATENT DOCUMENTS

KR 10-0962916 B1 6/2010

* cited by examiner

*Primary Examiner* — Stephen T. Reed
(74) *Attorney, Agent, or Firm* — Innovation Counsel LLP

(57) ABSTRACT

A data driver includes output channels configured to output data signals, output controllers selectively outputting data signals having a first arrangement or data signals having a second arrangement to output channel groups each of which includes N output channels in response to arrangement control signals, where N is a positive integer greater than or equal to 2, and a control signal generator outputting the arrangement control signals to the output controllers to control the output controllers.

19 Claims, 14 Drawing Sheets

DATA DRIVER, DISPLAY DEVICE HAVING DATA DRIVER, AND ELECTRONIC DEVICE HAVING DATA DRIVER

PRIORITY STATEMENT

This application claims priority under 35 U.S.C. § 119 to Korean Patent Application No. 10-2022-0119654, filed on Sep. 21, 2022, and Korean Patent Application No. 10-2022-0147832, filed on Nov. 8, 2022, in the Korean Intellectual Property Office KIPO, the contents of which are herein incorporated by reference in their entireties.

BACKGROUND

1. Field

Embodiments of the present inventive concept relate to a data driver, a display device having the data driver, and an electronic device having the data driver. More particularly, embodiments of the present inventive concept relate to a data driver changing an output arrangement, a display device having the data driver, and an electronic device having the data driver.

2. Description of the Related Art

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

Each of the pixels may include a red sub-pixel displaying a red color, a green sub-pixel displaying a green color, and a blue sub-pixel displaying a blue color. The pixels may have various structures according to an arrangement of the red sub-pixels, the green sub-pixels, and the blue sub-pixels. For example, the pixels may have a stripe structure, a diamond pentile structure, and the like.

However, input image data input to the display device may not be input according to the structure of the pixels. Accordingly, the display device may need to remap the input image data according to the structure of the pixels.

SUMMARY

Embodiments of the present inventive concept provide a data driver that changes an output arrangement.

Embodiments of the present inventive concept also provide an electronic device having the data driver.

Embodiments of the present inventive concept also provide an display device having the data driver.

According to embodiments of the present inventive concept, a data driver may include output channels configured to output data signals, output controllers configured to selectively output data signals having a first arrangement or data signals having a second arrangement to output channel groups each of which includes N output channels in response to arrangement control signals, where N is a positive integer greater than or equal to 2, and a control signal generator configured to output the arrangement control signals to the output controllers to control the output controllers.

In an embodiment, the control signal generator may be configured to independently control the output controllers.

In an embodiment, a first output controller among the output controllers may be configured to selectively output data signals for a first color to a first output channel or a third output channel in response to one of the arrangement control signals, the first output controller may be configured to selectively output data signals for a second color to the first output channel or the third output channel in response to the one of the arrangement signals, and the first output controller may be configured to output data signals for a third color to a second output channel and a fourth output channel.

In an embodiment, the first color may be a red, the second color may be a blue, and the third color may be a green.

In an embodiment, the first arrangement and the second arrangement include a first color, a second color, and a third color, the first arrangement may be an arrangement of an order of the first color, the third color, the second color, and the third color, and the second arrangement may be an arrangement of an order of the second color, the third color, the first color, and the third color.

According to embodiments of the present inventive concept, an electronic device may include a display module, a sub processor configured to control the display module, and a main processor configured to supply input image data to the sub processor, the display module may include a display panel including a display region including a first display region, a second display region disposed adjacent to the first display region, and a third display region disposed adjacent to the second display region, sub-pixels, fan-out lines which include a first fan-out lines, a second fan-out lines, and a third fan-out lines, and a data driver configured to output data signals to data lines through the first to third fan-out lines, the first fan-out lines may be connected to the data lines connected to the sub-pixels disposed on the first display region, the second fan-out lines may be connected to the data lines connected to the sub-pixels disposed on the second display region, the third fan-out lines may be connected to the data lines connected to the sub-pixels disposed on the third display region, and the data driver may include output channels configured to output the data signals, output controllers configured to selectively output data signals having a first arrangement or data signals having a second arrangement to output channel groups each of which includes N output channels in response to arrangement control signals, where N is a positive integer greater than or equal to 2, and a control signal generator configured to output the arrangement control signals to the output controllers to control the output controllers.

In an embodiment, groups of the first fan-out lines and groups of the second fan-out lines are alternately arranged in a peripheral region of the display panel. Each of the groups of the first fan-out lines and the groups of the second fan-out lines includes M fan-out lines, where M is a positive integer greater than or equal to 2.

In an embodiment, groups of the output channels connected to the first fan-out lines and groups of the output channels connected to the second fan-out lines are alternately arranged in in a peripheral region of the display panel. Each of the groups of the output channels connected to the first fan-out lines and the groups of the output channels connected to the second fan-out lines may include M output channels, where M is a positive integer greater than or equal to 2.

In an embodiment, the N is an integer multiple of the M.

In an embodiment, the data lines may include data lines connected to first color sub-pixels displaying a first color and second color sub-pixels displaying a second color.

In an embodiment, the output controllers may be configured to output the data signals having the second arrangement after outputting the data signals having the first arrangement, and the output controllers may be configured to output the data signals having the first arrangement after outputting the data signals having the second arrangement.

In an embodiment, the output controllers may include a first output controller and a second output controller disposed adjacent to the first output controller, the first output controller and the second output controller may be configured to output the data signals to the output channel groups connected to the first fan-out lines and the second fan-out lines, the second output controller may be configured to output data signals having the second arrangement when the first output controller outputs data signals having the first arrangement, and the second output controller may be configured to output the data signals having the first arrangement when the first output controller outputs data signals having the second arrangement.

In an embodiment, the output controllers connected to the third fan-out lines may be configured to output data signals having a same arrangement.

In an embodiment, the control signal generator may be configured to independently control the output controllers.

In an embodiment, a first output controller among the output controllers may be configured to selectively output data signals for a first color to a first output channel or a third output channel in response to one of the arrangement control signals, the first output controller may be configured to selectively output data signals for a second color to the first output channel or the third output channel in response to one of the arrangement signals, and the first output controller may be configured to output data signals for a third color to a second output channel and a fourth output channel.

In an embodiment, the first color may be a red, the second color may be a blue, and the third color may be a green.

In an embodiment, the first arrangement and the second arrangement may include a first color, a second color, and a third color, the first arrangement may be an arrangement of an order of the first color, the third color, the second color, and the third color, and the second arrangement may be an arrangement of an order of the second color, the third color, the first color, and the third color.

In an embodiment, each of the first fan-out line may be connected to a corresponding data line via the display region.

According to embodiments of the present inventive concept, a display device may include a display panel including a display region including a first display region, a second display region disposed adjacent to the first display region, and a third display region disposed adjacent to the second display region, sub-pixels, fan-out lines which include a first fan-out lines, a second fan-out lines, and a third fan-out lines, a data driver configured to output data signals to data lines through the first to third fan-out lines, and a timing controller configured to control the data driver, the first fan-out lines may be connected to the data lines connected to the sub-pixels disposed in the first display region via the display region, the second fan-out lines may be connected to the data lines connected to the sub-pixels disposed in the second display region, the third fan-out lines may be connected to the data lines connected to the sub-pixels disposed in the third display region, the sub-pixels of a first pixel row may be configured to receive data signals having a first arrangement, the sub-pixels of a second pixel row disposed adjacent to the first pixel row may be configured to receive data signals having a second arrangement different from the first arrangement; the data driver may be configured to output data signals having a third arrangement in which the second arrangement follows the first arrangement or the data signals having a fourth arrangement in which the first arrangement follows the second arrangement to the first fan-out lines and the second fan-out lines.

In an embodiment, the data driver may include output channels configured to output the data signals, output controllers configured to selectively output data signals having a the first arrangement or the data signals having the second arrangement to output channel groups each of which includes N output channels in response to arrangement control signals, where N is a positive integer greater than or equal to 2, and a control signal generator configured to output the arrangement control signals to the output controllers to control the output controllers.

Therefore, the data driver may determine an arrangement of data signals supplied to data lines by including output channel groups each of which includes output channels outputting data signals, output controllers selectively outputting data signals having a first arrangement or data signals having a second arrangement to the output channel groups each of which include N output channels in response to arrangement control signals, and a control signal generator outputting the arrangement control signals to the output controllers to control the output controllers. Accordingly, the data driver may output the data signals in a more diverse arrangement than when all output channels are simultaneously switched.

In addition, the data driver may simultaneously perform switching of an arrangement required by a color displayed by sub-pixels being different for each of pixel rows and outputting of an arrangement required by forming the first fan-out lines via the display region without a separate global switch. Accordingly, a size of the data driver may be reduced, and power loss may be reduced.

Further, the display device may reduce a dead space (i.e., a peripheral region) of the display panel by connecting first fan-out lines to data lines connected to sub-pixels disposed on a first display region via a display region of the display panel.

Also, the display device may connect fan-out lines to data lines with no overlapping portions of the fan-out lines by outputting data signals corresponding to an arrangement of the fan-out lines which include the first fan-out lines and a second fan-out lines.

However, the effects of the present inventive concept are not limited to the above-described effects, and may be variously expanded without departing from the spirit and scope of the present inventive concept.

DETAILED DESCRIPTION OF THE INVENTIVE CONCEPT

Hereinafter, the present inventive concept will be explained in detail with reference to the accompanying drawings.

Figure 1:
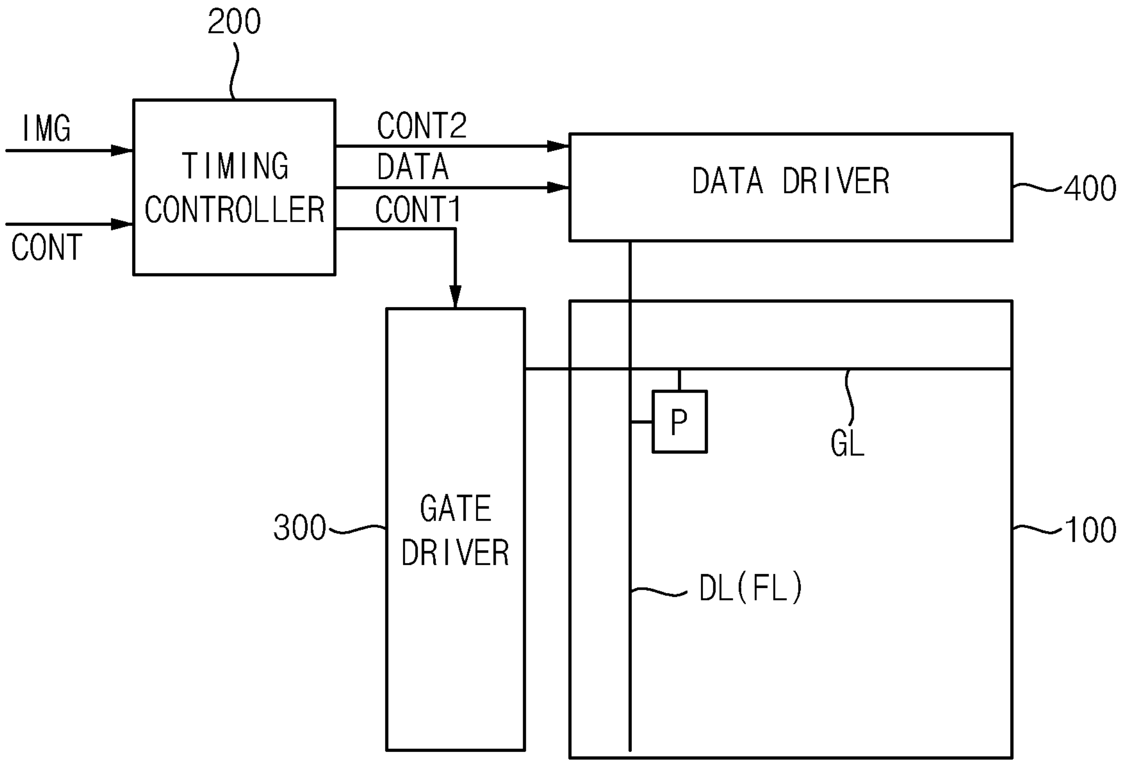
FIG. 1 is a block diagram illustrating a display device according to embodiments of the present inventive concept.

FIG. 1 is a block diagram illustrating a display device according to embodiments of the present inventive concept.

Referring to FIG. 1, the display device may include a display panel 100, a timing controller 200, a gate driver 300, and a data driver 400. In an embodiment, the timing controller 200 and the data driver 400 may be integrated into one chip.

The display panel 100 has a display region AA on which an image is displayed and a peripheral region PA disposed adjacent to the display region AA. In an embodiment, the gate driver 300 may be mounted on the peripheral region PA of the display panel 100. In an embodiment, the data driver 400 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL and the data lines DL may extend in directions crossing each other.

The timing controller 200 may receive input image data IMG and an input control signal CONT from a main processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL via fan-out lines FL.

Figure 2:
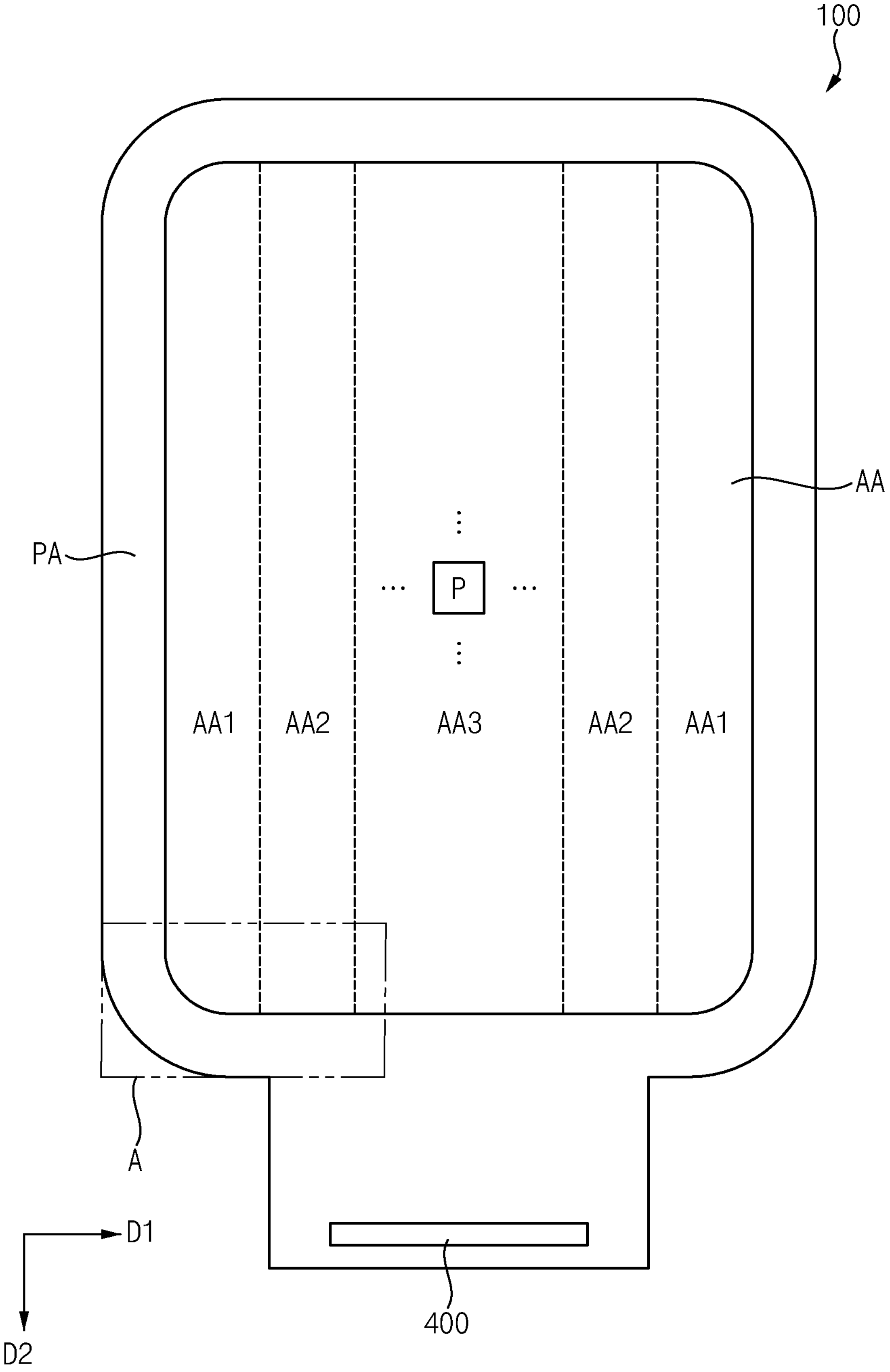
FIG. 2 is a diagram illustrating an example of a display panel of the display device of FIG. 1.

FIG. 2 is a diagram illustrating an example of the display panel 100 of the display device of FIG. 1.

Referring to FIGS. 1 and 2, the data driver 400 may be mounted on the peripheral region PA. The data driver 400 may be implemented as a driving chip. In an embodiment, the driving chip and the timing controller 200 may form one integrated chip.

The display region AA may include a first display region AA1, a second display region AA2 disposed adjacent to the first display region AA1, and a third display region AA3 disposed adjacent to the second display region AA2.

For example, the first display region AA1 may include an edge region of the display region AA. The region of the display region AA may have a curved structure.

Figure 3:
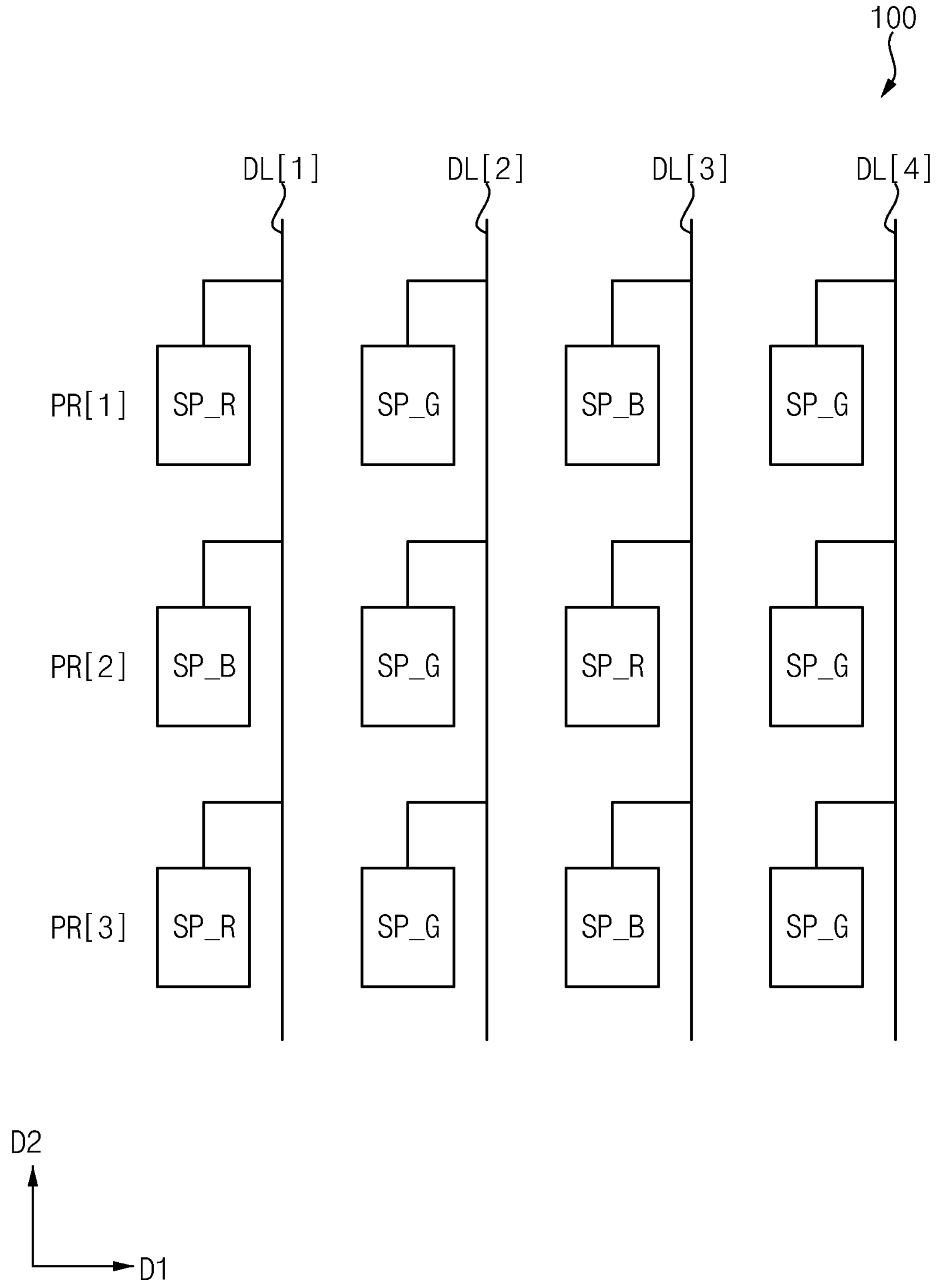
FIG. 3 is a diagram illustrating an example of pixels of a display panel of the display device of FIG. 1.

FIG. 3 is a diagram illustrating an example of the pixels P of the display panel 100 of the display device of FIG. 1.

Referring to FIG. 3, the pixels P may include first color sub-pixels SP_R displaying a first color, second color sub-pixels SP_B displaying a second color, and third color sub-pixels SP_G displaying a third color. For example, the first color may be a red, the second color may be a blue, and the third color may be a green.

In an embodiment, the data lines DL may include data lines connected to the first color sub-pixels SP_R displaying the first color and the second color sub-pixels SP_B displaying a second color. In an embodiment, the data lines DL may include data lines connected to the third color sub-pixels SP_G displaying the third color.

Arrangement of the sub-pixels SP_R, SP_B, and SP_G may be different for each of pixel rows PR[1], PR[2], and PR[3]. Accordingly, since the data voltages applied to the data lines DL connected to the first color sub-pixels SP_R and the second color sub-pixels SP_B are switched to the first color or the second color for each of the pixel rows PR[1], PR[2], and PR[3], an arrangement described later may also be switched.

In this embodiment, each of the pixels P is exemplified as an RGBG structure which includes one first color sub-pixel, one second color sub-pixel, and two third color sub-pixels, but the present inventive concept is not limited thereto. In the RGBG structure, R represents the first color, B represents the second color, and G represents the third color.

Figure 4:
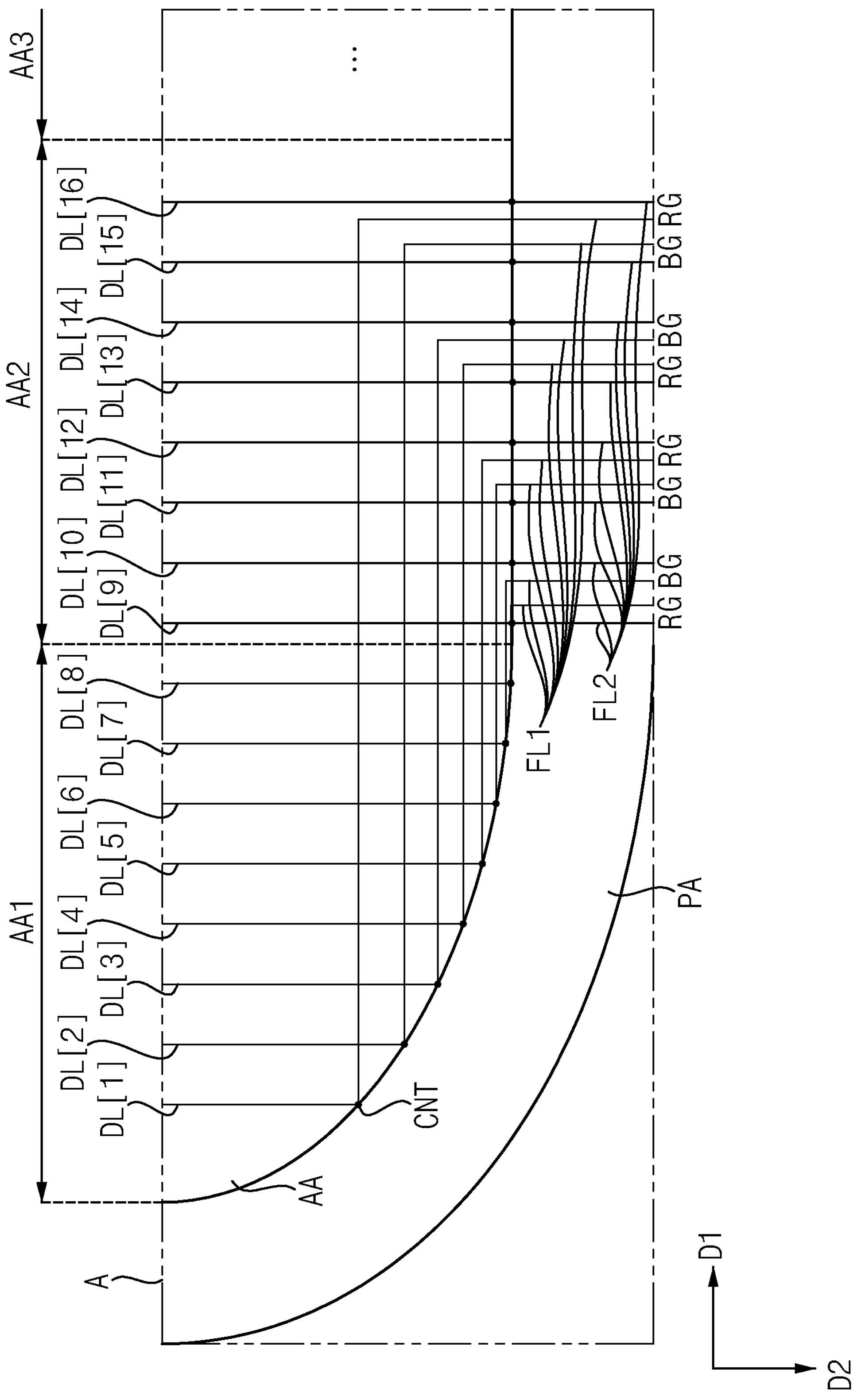
FIG. 4 is a diagram illustrating an example of a first display region and a second display region of a region A of FIG. 2.

FIG. 4 is a diagram illustrating an example of the first display region AA1 and the second display region AA2 of a region A of FIG. 2.

FIG. 4 illustrates the second display region AA2 disposed adjacent to the third display region AA3 in a first direction D1 and the first display region AA1 disposed adjacent to the second display region AA2 in the first direction D1 in the region A. Colors R, G, and B of FIG. 4 represent colors of the data voltages applied to the first pixel row PR[1] of FIG. 3.

Referring to FIGS. 1 to 4, fan-out lines FL1 and FL2 may be arranged in the peripheral region PA of the display panel 100. The display panel 100 may include first fan-out lines FL1 and second fan-out-lines FL2. The first fan-out lines FL1 may be connected to data lines (DL[1], DL[2], . . . , DL[8]) which are connected to the sub-pixels SP_R, SP_B, and SP_G disposed in the first display region AA1. For example, the second fan-out lines FL2 may be connected to data lines (DL[9], DL[10], . . . , DL [16]) which are connected to the sub-pixels SP_R, SP_B, and SP_G disposed in the second display region AA2.

The first fan-out lines FL1 and the second fan-out lines FL2 may be alternately arranged in M units, where M is a positive integer greater than or equal to 2 in the peripheral region PA of the display panel 100.

As disclosed in FIG. 4, when M is 2, the first fan-out lines FL1 and the second fan-out lines FL2 may be connected to the data lines DL in an order of a ninth data line DL[9], an eighth data line DL[8], a seventh data line DL[7], a tenth data line DL[10], an eleventh data line DL[11], a sixth data line DL[6], a fifth data line DL[5], a twelfth data line DL[12], a thirteenth data line DL[13], a fourth data line DL[4], a third data Line DL[3], a fourteenth data line DL[14], a fifteenth data line DL[15], a second data line DL[2], a first data line DL[1], and a sixteenth data line DL[16] in the first direction D1.

In this embodiment, it is exemplified that groups of the first fan-out lines FL1 and groups of the second fan-out lines FL2 each of which includes two fan-out line are alternately arranged along the first direction, but the present inventive concept is not limited thereto.

The data lines DL may extend in the second direction D2 crossing the first direction D1 in the display region AA of the display panel 100. The fan-out lines FL may be connected to the data lines DL, respectively.

The first fan-out lines FL1 may be connected to the data lines (DL[1], DL[2], . . . , DL[8]) of the first display region AA1 via the display region AA and the peripheral region PA. For example, the first fan-out lines FL1 and the data lines (DL[1], DL[2], . . . , DL[8]) of the first display region AA1 may be disposed on different layer. For example, the first fan-out lines FL1 and the data lines (DL[1], DL[2], . . . , DL[8]) of the first display region AA1 may contact each other through a contact hole CNT.

The first fan-out line FL1 connected to the first data line DL[1] may surround the first fan-out line FL1 connected to the second data line DL[2]. The first fan-out line FL1 connected to the second data line DL2 may surround the first fan-out line FL1 connected to the third data line DL[3]. The first fan-out line FL1 connected to the third data line DL[3] may surround the first fan-out line FL1 connected to the fourth data line DL[4]. The first fan-out line FL1 connected to the fourth data line DL[4] may surround the first fan-out line FL1 connected to the fifth data line DL[5]. The first fan-out line FL1 connected to the fifth data line DL[5] may surround the first fan-out line FL1 connected to the sixth data line DL[6]. The first fan-out line FL1 connected to the sixth data line DL[6] may surround the first fan-out line FL1 connected to the seventh data line DL[7]. The first fan-out line FL1 connected to the seventh data line DL[7] may surround the first fan-out line FL1 connected to the eighth data line DL[8].

The second fan-out lines FL2 may be connected to the data lines (DL[9], . . . , DL[16]) of the second display region AA2 via the peripheral region PA. For example, the second fan-out lines FL2 and the data lines (DL[9], DL[10], . . . , DL[16]) of the second display region AA2 may be disposed on different layer. For example, the second fan-out lines FL2 and the data lines (DL[9], DL[10], . . . , DL[16]) of the second display region AA2 may contact each other through a contact hole CNT.

As such, the display device may reduce a dead space (i.e., the peripheral region PA) of the display panel 100 by connecting the first fan-out lines FL1 to the data lines (DL[1], DL[2], . . . , DL[8]) which are connected to the sub-pixels disposed on the first display region AA1 via the display region AA of the display panel 100.

The sub-pixels SP_R, SP_B, and SP_G of the first pixel row PR[1] may receive the data voltages according to a first arrangement, and the sub-pixels SP_R, SP_B, and SP_G of a second pixel row PR[2] adjacent to the first pixel row PR[1] may receive the data voltages according to a second arrangement different from the first arrangement. The fan-out lines FL may receive the data voltages according to a third arrangement in which the second arrangement follows the first arrangement or the data voltages according to a fourth arrangement in which the first arrangement follows the second arrangement. The sub-pixels SP_R, SP_B, and SP_G of one pixel row PR[1], PR[2], and PR[3] may be connected to one gate line GL.

For example, as shown in FIG. 3, it is assumed that the pixels P have the RGBG structure. In this case, the sub-pixels SP_R, SP_B, and SP_G of the first pixel row PR[1] may receive the data voltages according to a RGBG arrangement in the first direction D1. The sub-pixels SP_R, SP_B, and SP_G of the second pixel row PR[2] may receive the data voltages according to a BGRG arrangement in the first direction D1. Accordingly, as shown in FIG. 4, the fan-out lines FL may receive the data voltages according to a RGBGBGRG arrangement in which the RGBG arrangement is followed by the BGRG arrangement in the first pixel row PR[1]. Also, the fan-out lines FL may receive the data voltages according to a BGRGRGBG arrangement in which the BGRG arrangement is followed by the RGBG arrangement in the second pixel row PR[2]. Here, R represents the first color, B represents the second color, and G represents the third color.

That is, the data driver 400 may output the data voltages according to the third arrangement in which the second arrangement follows the first arrangement or the data voltages according to the fourth arrangement in which the first arrangement follows the second arrangement to the fan-out lines FL.

The arrangement may indicate colors displaying the data voltages. For example, when the data voltages are applied in the RGBG arrangement in the first direction D1, the data voltage for the first color R and the data voltage for the third color G, the data voltage for the second color B, and the data voltage for the third color G may be sequentially applied along the first direction D1. For example, when the data voltages are applied in the RGBG arrangement in the first direction D1, the data voltage for the first color R, the data voltage for the third color G, the data voltage for the second color B, and the data voltage for the third color G may be applied along the first direction D1.

For example, for the first pixel row PR[1], the data voltages for the first color R may be applied to the ninth data line DL[9], the fifth data line DL[5], the thirteenth data line DL[13], and the first data line DL[1]. For example, for the first pixel row PR[1], the data voltages for the second color B may be applied to the seventh data line DL[7], the eleventh data line DL[11], the third data line DL[3], and the fifteenth data line DL[15]. For example, for the first pixel row PR[1], the data voltages for the third color G may be applied to the eighth data line DL[8], the tenth data line DL[10], the sixth data line DL[6], the twelfth data line DL[12], the fourth data line DL[4], the fourteenth data line DL[14], the second data line DL [2], and the sixteenth data line DL[16].

FIG. 4 shows 16 data lines for convenience of description, and the display panel 100 may include more than 16 data lines in the first display region AA1 and the second display region AA2.

Figure 5:
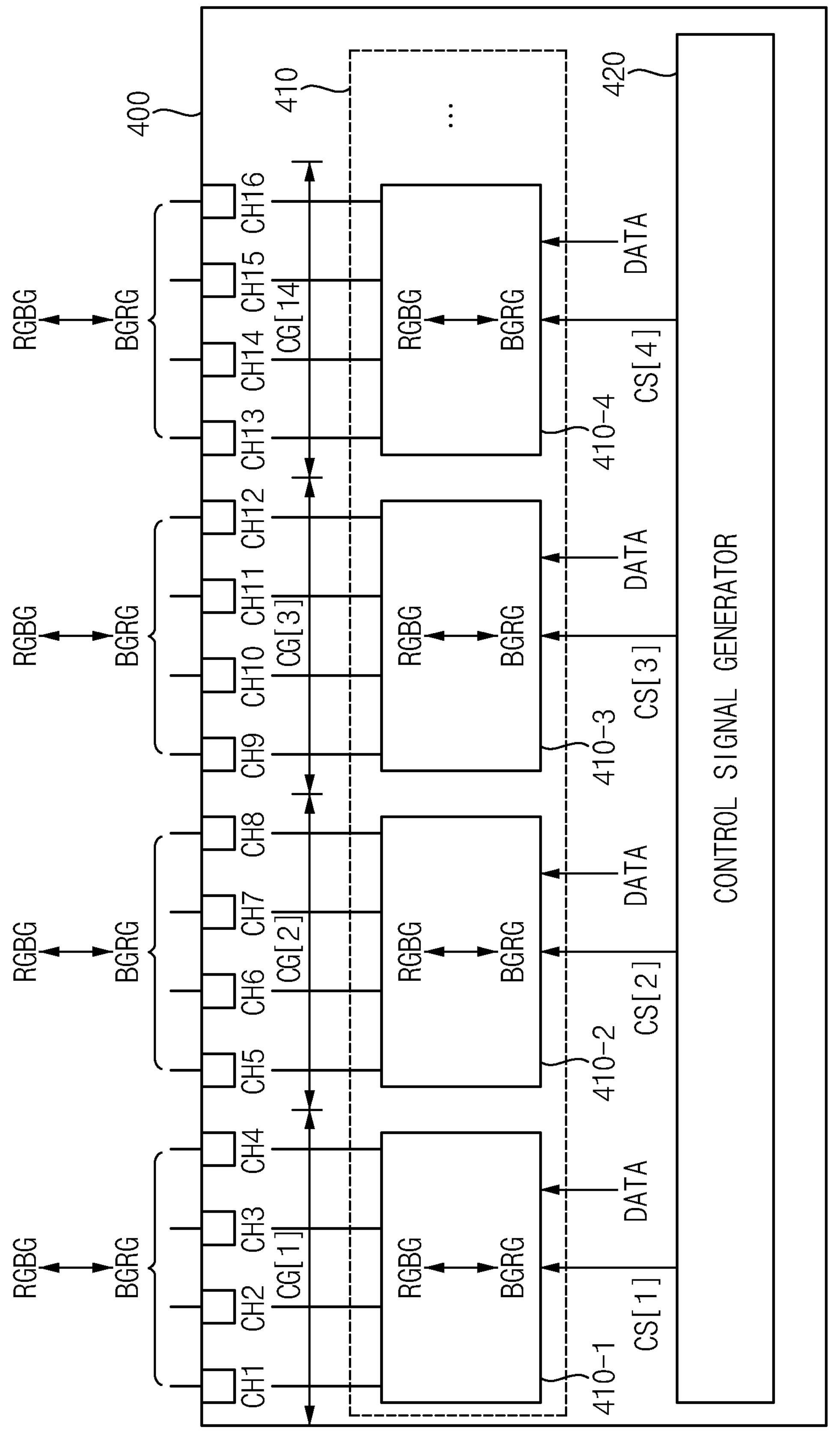
FIG. 5 is a diagram illustrating an example of a data driver of FIG. 1.
Figure 6:
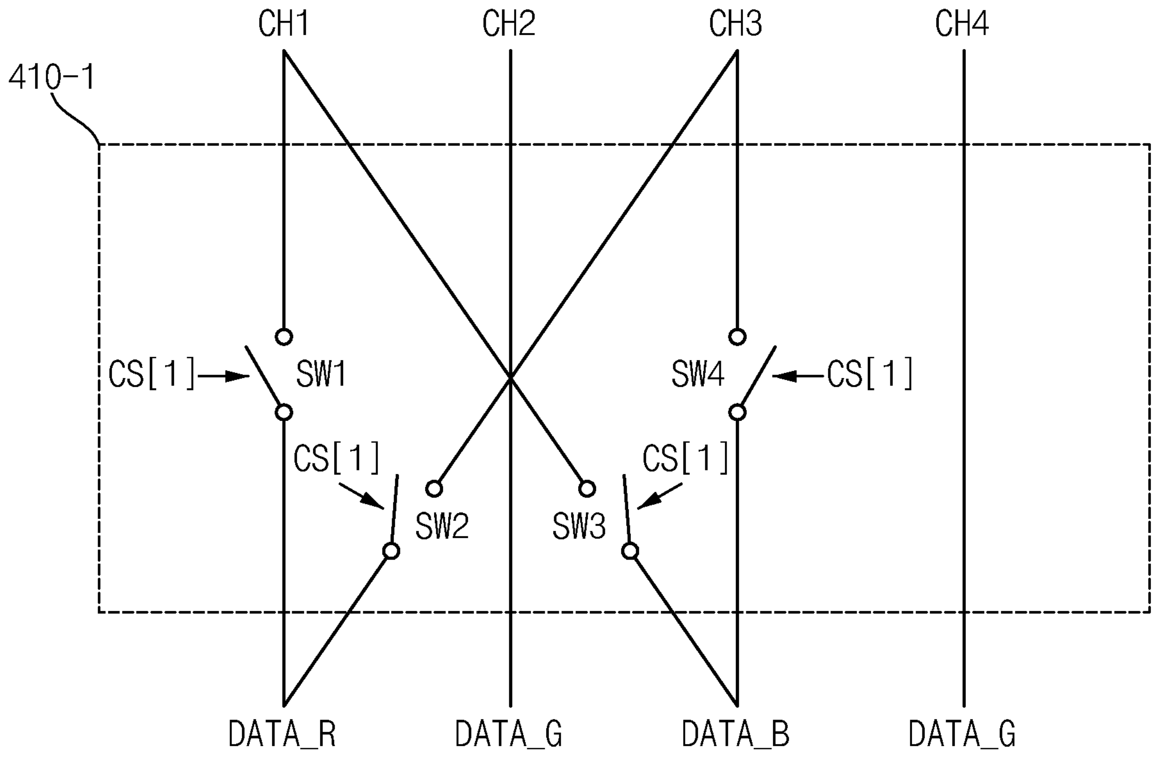
FIG. 6 is a diagram illustrating an example of a first output controller of FIG. 5.
Figure 7:
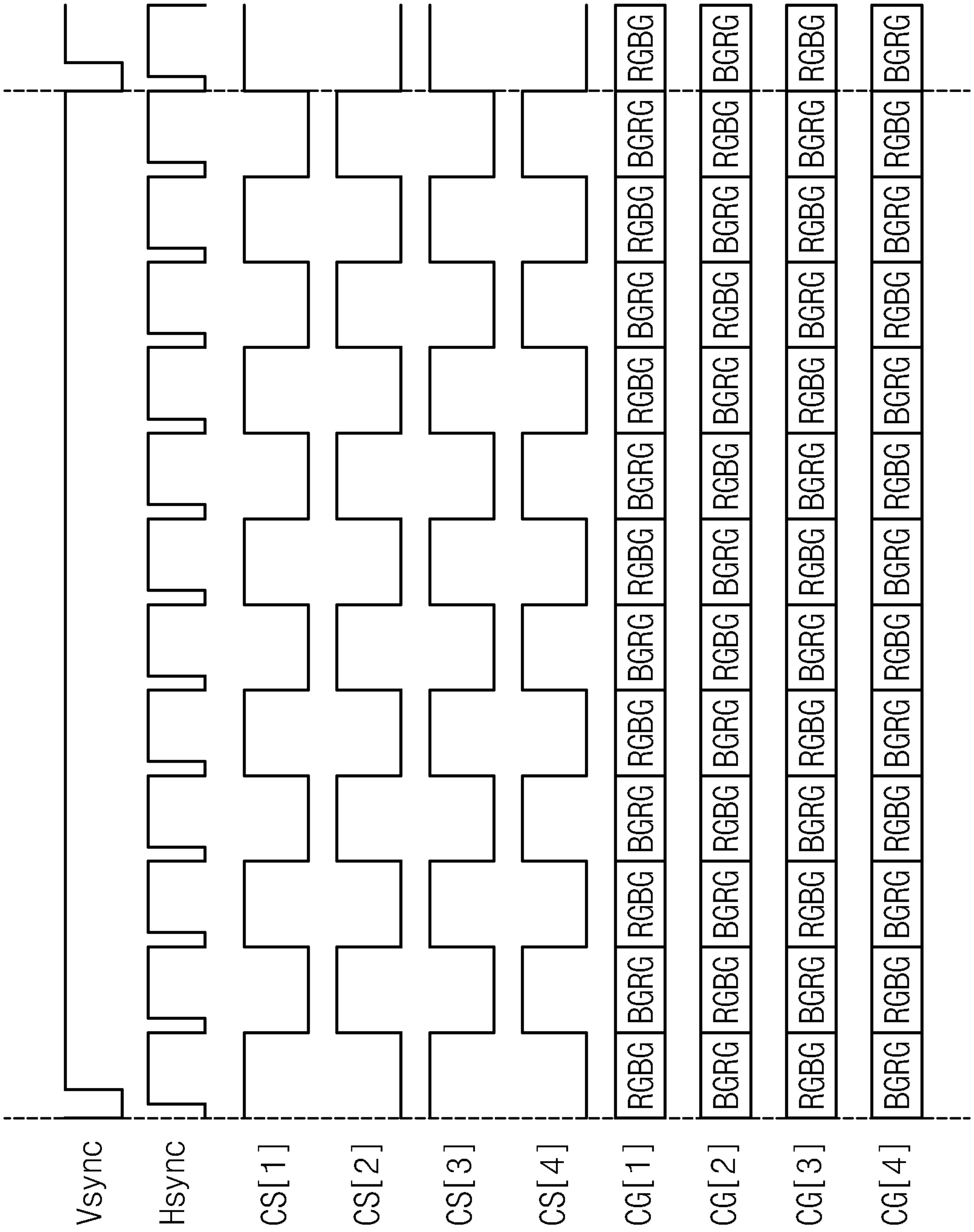
FIG. 7 is a timing diagram illustrating an example of an operation of a data driver of FIG. 5.

FIG. 5 is a diagram illustrating an example of the data driver 400 of FIG. 1, FIG. 6 is a diagram illustrating an example of a first output controller 410-1 of FIG. 5, and FIG. 7 is a timing diagram illustrating an example of an operation of the data driver 400 of FIG. 5.

Referring to FIGS. 1 and 3 to 7, the data driver 400 may include output channels (CH1, CH2, . . . , CH16), output controllers 410, and a control signal generator 420.

The output channels (CH1, CH2, . . . , CH16) may output the data voltages. For example, the output channel (CH1, CH2, . . . , CH16) may receive the data voltages from the output controllers 410 and output the data voltages to the fan-out lines FL.

The output controllers 410 may selectively output the data voltages according to the first arrangement (e.g., RGBG) or the data voltages according to the second arrangement (e.g., BGRG) to each of output channel groups CG[1], CG[2], CG[3], and CG[4] that includes the N output channels (CH1, CH2, . . . , CH16) in accordance with arrangement control signals CS[1], CS[2], CS[3], and CS[4].

The first arrangement and the second arrangement may include the first color R, the second color B, and the third color G. The second arrangement may be different from the first arrangement in the first color R and the second color B. For example, the first arrangement may be an arrangement of an order of the first color R, the third color G, the second color B, and the third color G, and the second arrangement may be an arrangement of an order of the second color B, the third color G, the first color R, and the third color sequence G. Here, R represents the first color, B represents the second color, and G represents the third color.

The first arrangement and the second arrangement may be determined according to the data lines DL connected to the fan-out lines FL which include the first and second fan-out lines FL1 and FL2. For example, when the fan-out lines FL which include the first and second fan-out lines FL1 and FL2) are repeatedly connected to the data lines DL connected to the first color sub-pixels SP_R and the second color sub-pixels SP_B, and the data lines DL connected to the third color sub-pixels SP_G in the first direction D1, the first arrangement may be RGBG, and the second arrangement may be BGRG. That is, the first arrangement and the second arrangement may be determined according to colors displayed by the sub-pixels SP_R, SP_B, and SP_G connected to the data lines DL which is connected to the fan-out lines FL which includes the first and second fan-out lines FL1 and FL2. However, the first arrangement and the second arrangement may be interchanged.

The output controllers 410 may output the data voltages according to the second arrangement after outputting the data voltages according to the first arrangement, and output the data voltages according to the second arrangement after outputting the data voltages according to the first arrangement.

For example, as shown in FIG. 3, each of the pixels P may have the RGBG structure. In this case, the displayed color of the data lines DL connected to the third color sub-pixels SP_G may be not changed for each of the pixel rows PR[1], PR[2], and PR[3]. However, the displayed color of the data lines DL connected to the first color sub-pixels SP_R and the second color sub-pixels SP_B may be changed for each of the pixel rows PR[1], PR[2], and PR[3]. Accordingly, the data driver 400 may alternately output arrangements (i.e., RGBG and BGRG) in which the first color R and the second color B are different for each pixel row PR[1], PR[2], and PR[3].

That is, the display device may perform switching of an arrangement required by a color displayed by sub-pixels SP_R, SP_B, and SP_G being different for each of the pixel rows PR[1], PR[2], and PR[3].

The output controllers 410 may include the first output controller 410-1 outputting the data voltages to a first ouputter group CG[1], a second output controller 410-2 outputting the data voltages to a second ouputter group CG[2], a third output controller 410-3 outputting the data voltages to a third ouputter group CG[3], and a fourth output controller 410-4 outputting the data voltages to a fourth ouputter group CG[4].

In this embodiment, FIG. 5 exemplifies four output controllers 410, but the present invention is not limited thereto.

The first output controller 410-1 may selectively output the data voltages DATA_R for the first color R to the first output channel CH1 or the third output channel CH3 in response to one of the arrangement control signals (i.e., CS[1]), selectively output the data voltages DATA_B for the second color B to the first output channel CH1 or the third output channel CH3 in response to one of the arrangement control signals (i.e., CS[1]), and output the data voltages DATA_G for the third color G to the second output channel CH2 and the fourth output channel CH4.

The first output controller 410-1 may include first to fourth switches SW1, SW2, SW3, and SW4 turned on in response to one of the arrangement control signals (i.e., CS[1]).

For example, the first and fourth switches SW1 and SW4 may be turned on when the applied arrangement control signal CS[1] has a high voltage level and the second and third switches SW2 and SW3 may be turned on when the applied arrangement control signal CS[1] has a low voltage level.

Although only the first output controller 410-1 is illustrated for convenience of description in FIG. 6, the output controllers (e.g., the second to fourth output controllers 410-2, 410-3, and 410-4) other than the first output controller 410-1 may also have a similar configuration.

In an embodiment, when the first arrangement control signal CS[1] has the high voltage level, the first output controller 410-1 may output the data voltages having the RGBG arrangement. For example, the first output controller 410-1 may output the data voltages to the first to fourth output channel CH1, CH2, CH3, and CH4 in an order of the data voltages DATA_R for the first color R, the data voltages DATA_G for the third color G, the data voltages DATA_B for the second color B, and the data voltages DATA_G for the third color G.

In an embodiment, when the first arrangement control signal CS[1] has the low voltage level, the first output controller 410-1 may output the data voltages DATA having the BGRG arrangement. For example, the first output controller 410-1 may output the data voltages DATA to the first to fourth output channel CH1, CH2, CH3, and CH4 in an order of the data voltages DATA_B for the second color B, the data voltage DATA_G for the third color G, the data voltage DATA_R for the first color R, and the data voltage DATA_G for the third color G.

In an embodiment, when the second arrangement control signal CS[2] has the high voltage level, the second output controller 410-2 may output the data voltages having the RGBG arrangement. For example, the second output controller 410-2 may output the data voltages to the fifth to eighth output channel CH5, CH6, CH7, and CH8 in an order of the data voltage DATA_R for the first color R, the data voltage DATA_G for the third color G, the data voltage DATA_B for the second color B, and the data voltage DATA_G for the third color G.

In an embodiment, when the second arrangement control signal CS[2] has the low voltage level, the second output controller 410-2 may output the data voltages having the BGRG arrangement. For example, the second output controller 410-2 may output the data voltages to the fifth to eighth output channel CH5, CH6, CH7, and CH8 in an order of the data voltage DATA_B for the second color B, the data voltage DATA_G for the third color G, the data voltage DATA_R for the first color R, and the data voltage DATA_G for the third color G.

In an embodiment, when the third arrangement control signal CS[3] has the high voltage level, the third output controller 410-3 may output the data voltages having the RGBG arrangement. For example, the third output controller 410-3 may output the data voltages to the ninth to twelfth output channel CH9, CH10, CH11, and CH12, in an order of the data voltage DATA_R for the first color R, the data voltage DATA_G for the third color G, the data voltage DATA_B for the second color B, and the data voltage DATA_G for the third color G.

In an embodiment, when the third arrangement control signal CS[3] has the low voltage level, the third output controller 410-3 may output the data voltages having the BGRG arrangement. For example, the third output controller 410-3 may output the data voltages to the ninth to twelfth output channel CH9, CH10, CH11, and CH12 in an order of the data voltage DATA_B for the second color B, the data voltage DATA_G for the third color G, the data voltage DATA_R for the first color R, and the data voltage DATA_G for the third color G.

In an embodiment, when the fourth arrangement control signal CS[4] has the high voltage level, the fourth output controller 410-4 may output the data voltages having the RGBG arrangement. For example, the fourth output controller 410-4 may output the data voltages to the thirteenth to sixteenth output channel CH13, CH14, CH15, and CH16 in an order of the data voltage DATA_R for the first color R, the data voltage DATA_G for the third color G, the data voltage DATA_B for the second color B, and the data voltage DATA_G for the third color G.

In an embodiment, when the fourth arrangement control signal CS[4] has the low voltage level, the fourth output controller 410-4 may output the data voltages having the BGRG arrangement. For example, the fourth output controller 410-4 may output the data voltages to the thirteenth to sixteenth output channel CH13, CH14, CH15, and CH16 in an order of the data voltage DATA_B for the second color B, the data voltage DATA_G for the third color G, the data voltage DATA_R for the first color R, and the data voltage DATA_G for the third color G.

The control signal generator 420 may output the arrangement control signals CS[1], CS[2], CS[3], and CS[4] to the output controllers 410 to control the output controllers 410. The control signal generator 420 may independently generate the arrangement control signals CS[1], CS[2], CS[3], and CS[4] for controlling each of the output controllers 410. Accordingly, the control signal generator 420 may independently control the first output controller 410-1, the second output controller 410-2, the third output controller 410-3, and the fourth output controller 410-4.

The display device may display an image of a new frame in synchronization with the vertical synchronizing signal Vsync. The display device may sequentially display images in the pixel rows in synchronization with the horizontal synchronizing signal Hsync. Accordingly, the switching of the arrangement required by the color displayed by the sub-pixels SP_R, SP_B, and SP_G being different for each of the pixel rows may be performed in synchronization with the horizontal synchronizing signal Hsync.

In an embodiment, the control signal generator 420 may generate the arrangement control signals CS[1], CS[2], CS[3], and CS[4] based on the vertical synchronizing signal Vsync and the horizontal synchronizing signal Hsync. In another embodiment, the control signal generator 420 may generate the arrangement control signals CS[1], CS[2], CS[3], and CS[4] by receiving a separate signal from an outside.

The data driver 400 may determine an output arrangement (e.g., RGBG or BGRG) of the data voltages for each output channel group CG[1], CG[2], CG[3], and CG[4]. Accordingly, the data driver 400 may output the data voltages in a more diverse arrangement (e.g., RGBGBGRG or BGRGRGBG) than when all output channels (CH1, CH2, . . . , CH16) are simultaneously switched because the first output controllers 410-1, the second output controller 410-2, the third output controller 410-3, and the fourth output controller 410-4 may be independently controlled using the arrangement control signals CS[1], CS[2], CS[3], and CS[4], respectively.

Figure 8:
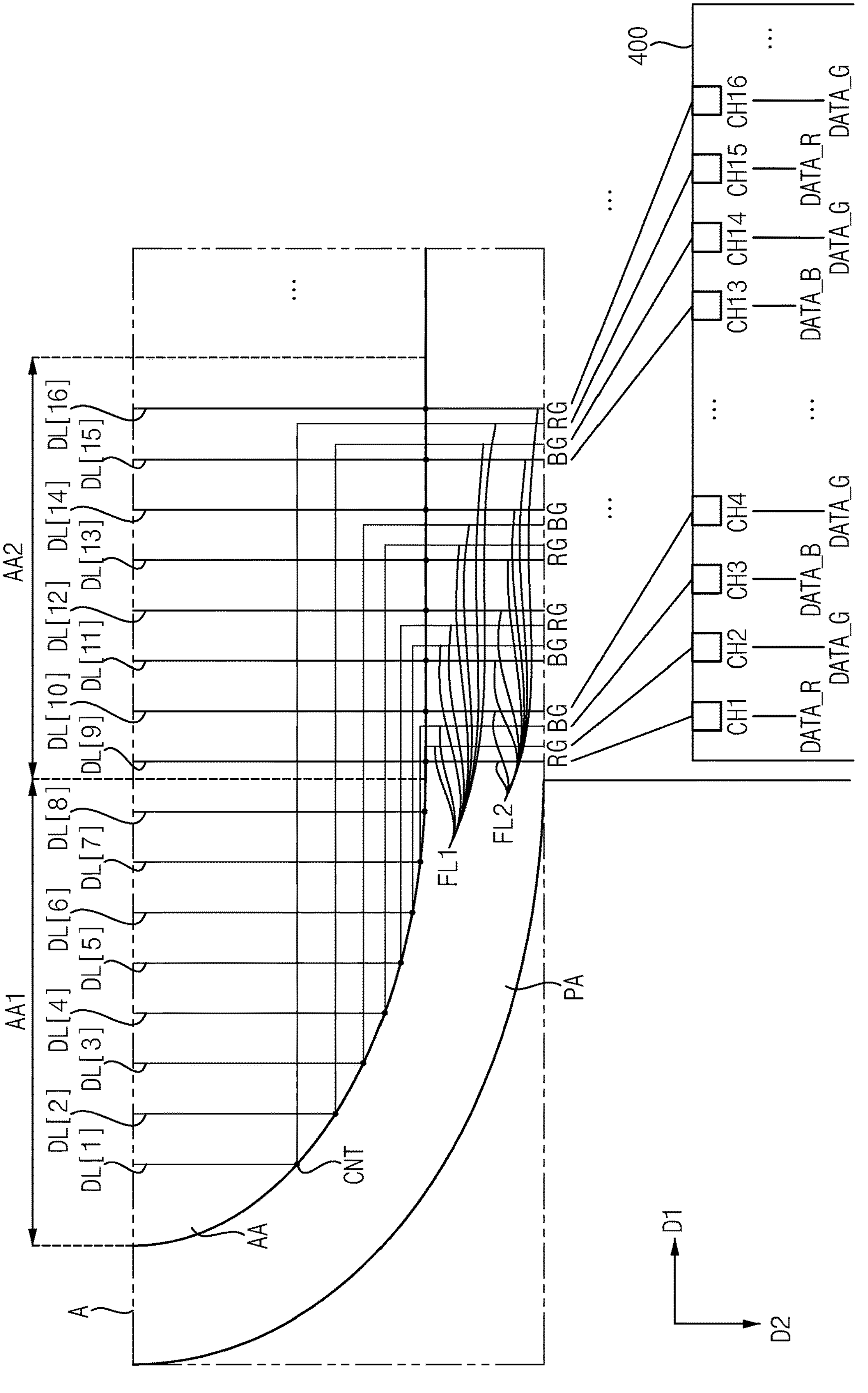
FIG. 8 is a diagram illustrating an example in which the display device of FIG. 1 applies data signals to a first fan-out lines and a second fan-out lines of FIG. 4.

FIG. 8 is a diagram illustrating an example in which the display device of FIG. 1 applies data voltages to the fan-out lines FL which include the first fan-out lines FL1 and the second fan-out lines FL2 of FIG. 4.

Referring to FIGS. 1, 3, 7, and 8, the output controllers 410 may include the first output controller 410-1, a second output controller 410-2 disposed adjacent to the first output controller 410-1, the third output controller 410-3 disposed adjacent to the second output controller 410-2, and the fourth output controller 410-4 disposed adjacent to the third output controller 410-3, and the first to fourth output controllers 410-1, 410-2, 410-3 and 410-4 may output the data voltages to the output channel groups CG[1], CG[2], CG[3], and CG[4] connected to the fan-out lines FL which include the first fan-out lines FL1 and the second fan-out lines FL2, respectively.

The second output controller 410-2 may output the data voltages according to the second arrangement when the first output controller 410-1 outputs the data voltages according to the first arrangement, and the second output controller 410-2 may output the data voltages according to the first arrangement when the first output controller 410-1 outputs the data voltages according to the second arrangement.

For example, when the first arrangement control signal CS[1] has the high voltage level, the second arrangement control signal CS[2] may have the low voltage level. For example, when the first arrangement control signal CS[1] has the low voltage level, the second arrangement control signal CS[2] may have the high voltage level.

For example, when the first output controller 410-1 outputs the data voltages in the RGBG arrangement, the second output controller 410-2 may output the data voltages in the BGRG arrangement.

When the second output controller 410-2 outputs the data voltages according to the first arrangement, the third output controller 410-3 may output the data voltages according to the second arrangement, and when the second output controller 410-2 outputs the data voltages according to the second arrangement, the third output controller 410-3 may output the data voltages according to the first arrangement.

For example, when the second arrangement control signal CS[2] has the high voltage level, the third arrangement control signal CS[3] may have the low voltage level. For example, when the second arrangement control signal CS[2] has the low voltage level, the third arrangement control signal CS[3] may have the high voltage level.

For example, when the second output controller 410-2 outputs the data voltages in the RGBG arrangement, the third output controller 410-3 may output the data voltages in the BGRG arrangement.

When the third output controller 410-3 outputs the data voltages according to the first arrangement, the fourth output controller 410-4 may output the data voltages according to the second arrangement, and when the third output controller 410-3 outputs the data voltages according to the second arrangement, the fourth output controller 410-4 may output the data voltages according to the first arrangement.

For example, when the third arrangement control signal CS[3] has the high voltage level, the fourth arrangement control signal CS[4] may have the low voltage level. For example, when the third arrangement control signal CS[3] has the low voltage level, the fourth arrangement control signal CS[4] may have the high voltage level.

For example, when the third output controller 410-3 outputs the data voltages in the RGBG arrangement, the fourth output controller 410-4 may output the data voltages in the BGRG arrangement.

Accordingly, each of the output channel groups CG[1], CG[2], CG[3], and CG[4] connected to the fan-out lines FL which include the first fan-out lines FL1 and the second fan-out lines FL2 may output the data voltages in an arrangement different from that of the adjacent output channel groups CG[1], CG[2], CG[3], and CG[4].

As described above, since the colors displayed by the sub-pixels SP_R, SP_B, and SP_G are different for each of the pixel rows PR[1], PR[2], and PR[3], changing of the arrangement may be required. For example, when the first to fourth output controllers 410-1, 410-2, 410-3, and 410-4 output the data voltages in the RGBG arrangement in the first pixel row PR[1], the data voltages may be output in the BGRG arrangement in the second pixel row PR[2]. For example, when the first to fourth output controllers 410-1, 410-2, 410-3, and 410-4 output data voltages in the BGRG arrangement in the first pixel row PR[1], the data voltages may be output in the RGBG arrangement in the second pixel row PR[2].

The switching of the arrangement may be performed with one global switch. However, as shown in FIG. 8, due to the first fan-out lines FL1, the data voltages having the same arrangement as a sub-pixel arrangement may not be output to the fan-out lines FL. Therefore, the required arrangement (i.e., an arrangement required by alternately arranging the first fan-out lines FL1 and the second fan-out lines FL2) may not be output with one global switch that simultaneously switches all output channel groups CG[1], CG[2], CG[3], and CG[4] due to the first fan-out lines FL1.

Therefore, instead of including separate switches for the switching of the required arrangement and outputting of the required arrangement, the display device may include the output controller 410 independently controlling each of the output channel groups CG[1], CG[2], CG[3], and CG[4]. Accordingly, the display device may determine an output arrangement of the data voltages for each output channel group CG[1], CG[2], CG[3], and CG[4]. In addition, by determining the output arrangement of the data voltages without a separate global switch, a size of the data driver 400 may be reduced and power loss may be reduced.

Groups of the first fan-out lines FL1 and groups of the second fan-out lines FL2 may be alternately arranged in the peripheral region PA of the display panel 100. Each groups of the first fan-out lines FL1 and each groups of the second fan-out lines FL2 may include M fan-out lines, respectively, where M is a positive integer greater than or equal to 2. The output channel groups which includes CG[1], CG[2], CG[3], and CG[4] may include the N output channels (CH1, CH2, . . . , CH16), where the N is an integer multiple of the M.

For example, the first output channel group CG[1] may include the first to fourth output channels CH1, CH2, CH3, and CH4. The first and fourth output channels CH1 and CH4 may be connected to the second fan-out lines FL2. The second and third output channels CH2 and CH3 may be connected to the first fan-out lines FL1.

For example, the second output channel group CG[2] may include the fifth to eighth output channels CH5, CH6, CH7, and CH8. The fifth and eighth output channels CH5 and CH8 may be connected to the second fan-out lines FL2. The sixth and seventh output channels CH6 and CH7 may be connected to the first fan-out lines FL1.

For example, the third output channel group CG[3] may include the ninth to twelfth output channels CH9, CH10, CH11, and CH12. The ninth and twelfth output channels CH9 and CH12 may be connected to the second fan-out lines FL2. The tenth and eleventh output channels CH10 and CH11 may be connected to the first fan-out lines FL1.

For example, the fourth output channel group CG[4] may include the thirteenth to sixteenth output channels CH13, CH14, CH15, and CH16. The thirteenth and sixteenth output channels CH13 and CH16 may be connected to the second fan-out lines FL2. The fourteenth and fifteenth output channels CH14 and CH15 may be connected to the first fan-out lines FL1.

As such, the display device may connect the fan-out lines FL to the data lines DL with no overlapping portions of the fan-out lines FL by outputting the data voltages corresponding to an arrangement of the fan-out lines FL which include the first fan-out lines FL1 and the second fan-out lines FL2.

Figure 9:
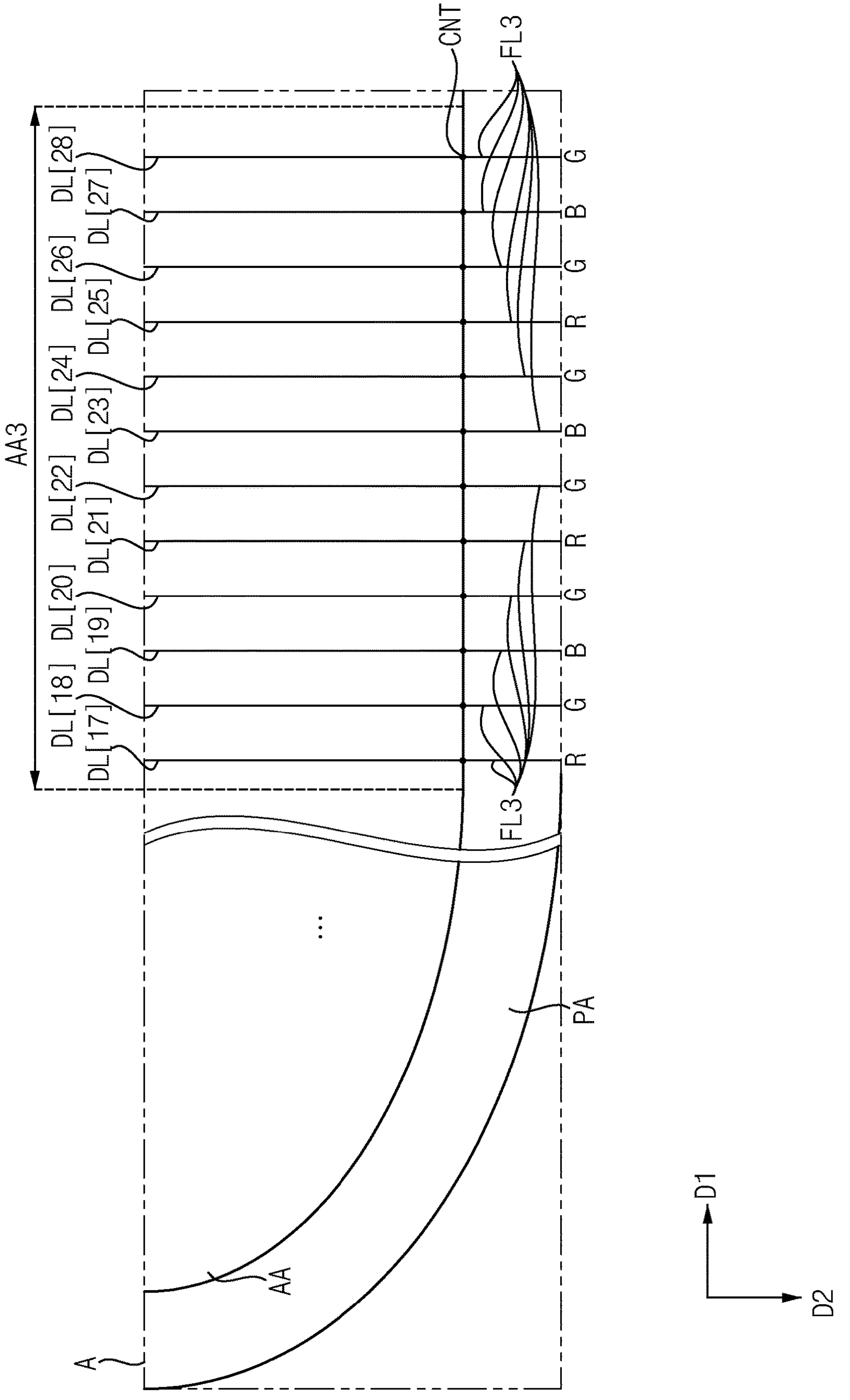
FIG. 9 is a diagram illustrating an example of a third display region of a region A of FIG. 2.

In this embodiment, it is exemplified that four groups of output channel CG[1], CG[2], CG[3], CG[4] are connected to the fan-out lines FL which include the first fan-out lines FL1 and the second fan-out lines FL2, but the present inventive concept is not limited thereto. FIG. 9 is a diagram illustrating an example of the third display region AA3 of the region A of FIG. 2.

FIG. 9 illustrates the third display region AA3 disposed adjacent to the second display region AA2 in region A in the first direction D1. Colors R, G, and B of FIG. 9 represent colors of the data voltages applied to the first pixel row PR[1] of FIG. 3. Referring to FIGS. 1 to 3 and 9, the fan-out lines FL1 and FL2 may be arranged in the peripheral region PA of the display panel 100. The display panel 100 may include a third fan-out lines FL3. For example, the third fan-out lines FL3 may be connected to the sub-pixels SP_R, SP_B, and SP_G disposed in the third display region AA3.

The third fan-out lines FL3 may be connected to the data lines (DL[17], DL[18], . . . , DL[28]) of the third display region AA3 via the peripheral region PA. For example, the third fan-out lines FL3 and the data lines (DL[17], DL[18], . . . , DL[28]) of the third display region AA3 may be disposed on different layer. For example, the third fan-out lines FL3 and the data lines (DL[17], DL[18], . . . , DL[28]) of the third display region AA3 may contact each other through the contact hole CNT.

The sub-pixels SP_R, SP_B, and SP_G of the first pixel row PR[1] may receive the data voltages according to the first arrangement, and the sub-pixels SP_R, SP_B, and SP_G of the second pixel row PR[2] disposed adjacent to the first pixel row PR[1] may receive the data voltages according to the second arrangement different from the first arrangement. The third fan-out lines FL3 may receive the data voltages according to the first arrangement or the data voltages according to the second arrangement.

For example, as shown in FIG. 3, it is assumed that the pixels P have the RGBG structure. In this case, the sub-pixels SP_R, SP_B, and SP_G of the first pixel row PR[1] may receive the data voltages according to the RGBG arrangement in the first direction D1. The sub-pixels SP_R, SP_B, and SP_G of the second pixel row PR[2] may receive the data voltages according to the BGRG arrangement in the first direction D1. Accordingly, as shown in FIG. 9, the third fan-out lines FL3 may receive the data voltages according to the RGBG arrangement in the first pixel row PR[1]. Also, the third fan-out lines FL3 may receive the data voltages according to the BGRG arrangement in the second pixel row PR[2]. Here, R represents the first color, B represents the second color, and G represents the third color. That is, the data driver 400 may output the data voltages according to the first arrangement or the data voltages according to the second arrangement to the third fan-out lines FL3.

For example, the data voltages for the first color R may be applied to the seventeenth data line DL[17], the twenty-first data line DL[21], and the twenty-fifth data line DL[25]. For example, the data voltages for the second color B may be applied to the nineteenth data line DL[19], the twenty-third data line DL[23], and the twenty-seventh data line DL[27]. For example, the data voltages for the third color G may be applied to the eighteenth data line DL[18], the twentieth data line DL[20], the twenty-second data line DL[22], the twenty-fourth data line DL[24] the twenty-sixth data line DL[26], and the twenty-eighth data line DL[28].

FIG. 9 shows 12 data lines for convenience of explanation, and the display panel 100 may include more than 12 data lines in the third display region AA3.

Figure 10:
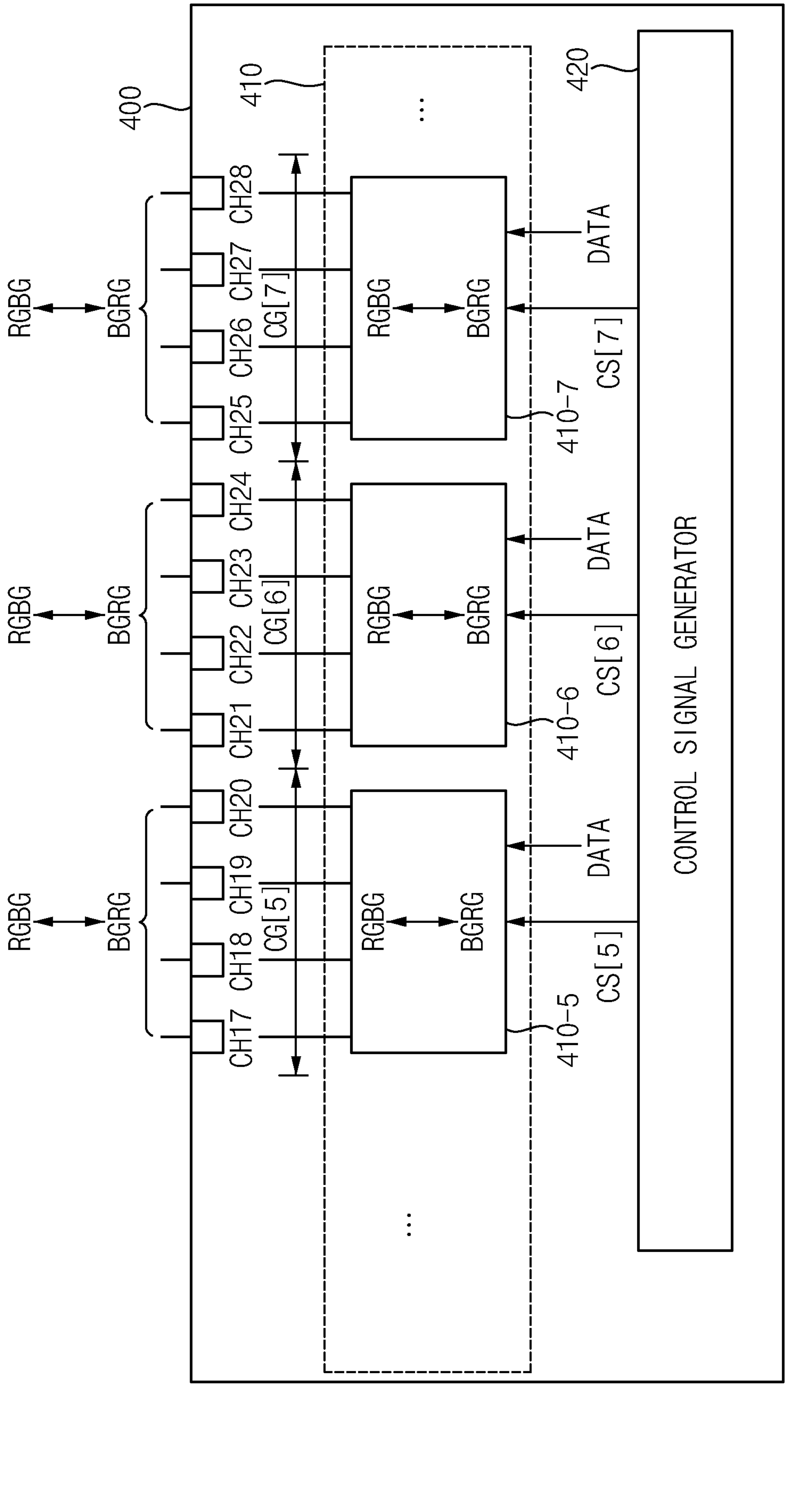
FIG. 10 is a diagram illustrating an example of a data driver of FIG. 1.
Figure 11:
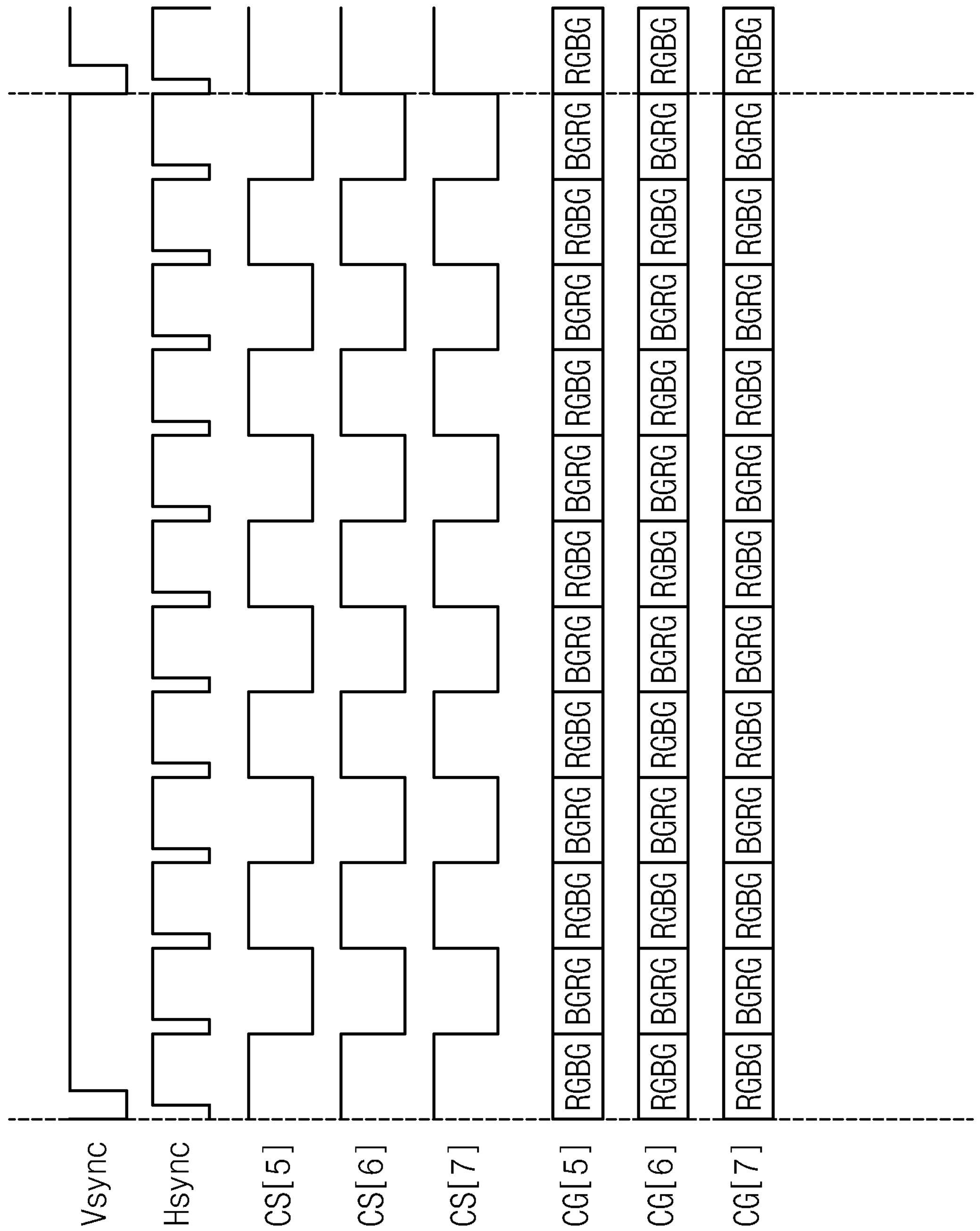
FIG. 11 is a timing diagram illustrating an example of an operation of a data driver of FIG. 10.
Figure 12:
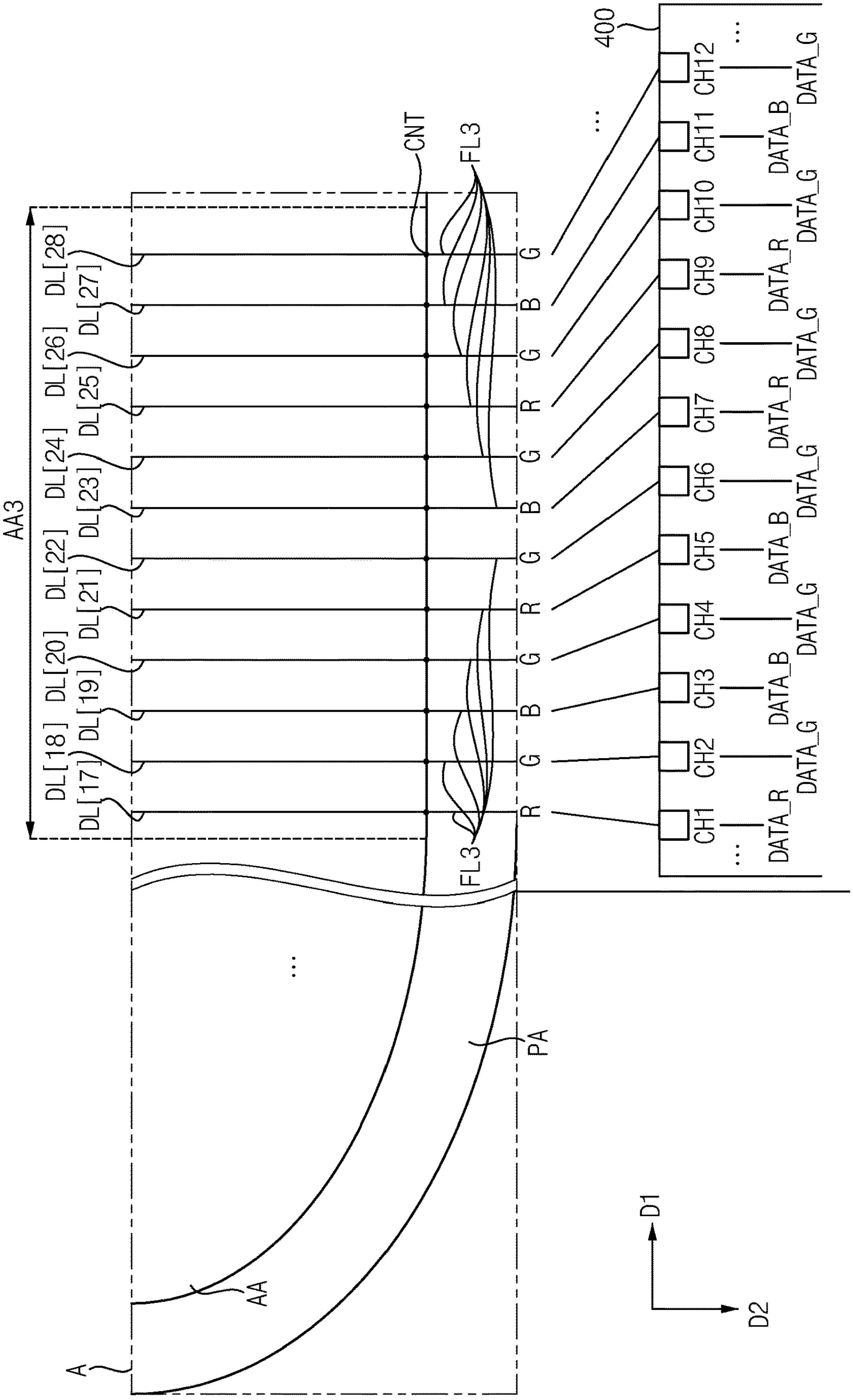
FIG. 12 is a diagram illustrating an example in which the display device of FIG. 1 applies data signals to a third fan-out lines of FIG. 9.

FIG. 10 is a diagram illustrating an example of the data driver 400 of FIG. 1, FIG. 11 is a timing diagram illustrating an example of an operation of the data driver 400 of FIG. 10, and FIG. 12 is a diagram illustrating an example in which the display device of FIG. 1 applies the data voltages to the third fan-out lines FL3 of FIG. 9.

Referring to FIGS. 1, 3, 6, 10, 11, and 12, the data driver 400 may include output channels (CH17, CH18, . . . , CH28), output controllers 410, and a control signal generator 420.

The output channels (CH17, CH18, . . . , CH28) may output the data voltages DATA. For example, the output channels (CH17, CH18, . . . , CH28) may receive the data voltages from the output controllers 410 and output the data voltages to the fan-out lines FL.

The output controllers 410 may selectively output the data voltages according to the first arrangement (e.g., RGBG) or the data voltages according to the second arrangement (e.g., BGRG) to output channel groups CG[5], CG[6], and CG[7] which include the N output channels (CH17, CH18, . . . , CH28) in response to arrangement control signals CS[5], CS[6], and CS[7].

Since the fifth to seventh output controllers 410-5, 410-6, and 410-7 have a configuration similar to that of the first output controller 410-1, overlapping descriptions will be omitted.

The output controllers 410 may include a fifth output controller 410-5, a sixth output controller 410-6 disposed adjacent to the fifth output controller 410-5, and a seventh output controller 410-7 disposed adjacent to the sixth output controller 410-6, and the fifth to seventh output controllers 410-5, 410-6, and 410-7 may apply the data voltages to the output channel groups CG[5], CG[6], and CG[7] connected to the third fan-out lines FL3, respectively.

The output controllers 410 may include the fifth output controller 410-5 outputting the data voltages to the fifth output channel group CG[5], the sixth output controller 410-6 outputting the data voltages to the sixth output channel group CG[6], and the seventh output controller 410-7 outputting the data voltages to the seventh output channel group CG[7].

For example, the fifth output controller 410-5 may output the data voltages to the seventeenth to twentieth output channels CH17, CH18, CH19, and CH20. The sixth output controller 410-6 may output data voltages to the twenty-first to twenty-fourth output channels CH21, CH22, CH23, and CH24. The seventh output controller 410-7 may output the data voltages to the twenty-fifth to twenty-eighth output channels CH25, CH26, CH27, and CH28.

In an embodiment, when the fifth arrangement control signal CS[5] has the high voltage level, the fifth output controller 410-5 may output the data voltage having the RGBG arrangement. For example, the fifth output controller 410-5 may apply the data voltages to the seventeenth to twentieth output channels CH17, CH18, CH19, and CH20 in an order of the data voltage DATA_R for the first color R, the data voltage DATA_G for the third color G, the data voltage DATA_B for the second color B, and the data voltage DATA_G for the third color G.

In an embodiment, when the fifth arrangement control signal CS[5] has the low voltage level, the fifth output controller 410-5 may output the data voltage having the BGRG arrangement. For example, the fifth output controller 410-5 may apply the data voltages to the seventeenth to twentieth output channels CH17, CH18, CH19, and CH20 in an order of the data voltage DATA_B for the second color B, the data voltage DATA_G for the third color G, the data voltage DATA_R for the first color R, and the data voltage DATA_G for the third color G.

In an embodiment, when the sixth arrangement control signal CS[6] has the high voltage level, the sixth output controller 410-6 may output the data voltage having the RGBG arrangement. For example, the sixth output controller 410-6 may apply the data voltages to the twenty-first to twenty-fourth output channels CH21, CH22, CH23, and CH24 in an order of the data voltage DATA_R for the first color R, the data voltage DATA_G for the third color G, the data voltage DATA_B for the second color B, and the data voltage DATA_G for the third color G.

In an embodiment, when the sixth arrangement control signal CS[6] has the low voltage level, the sixth output controller 410-6 may output the data voltage having the BGRG arrangement. For example, the sixth output controller 410-6 may apply the data voltages to the twenty-first to twenty-fourth output channels CH21, CH22, CH23, and CH24 in an order of the data voltage DATA_B for the second color B, the data voltage DATA_G for the third color G, the data voltage DATA_R for the first color R, and the data voltage DATA_G for the third color G.

In an embodiment, when the seventh arrangement control signal CS[7] has the high voltage level, the seventh output controller 410-7 may output the data voltage having the RGBG arrangement. For example, the seventh output controller 410-7 may apply the data voltages to the twenty-fifth to twenty-eighth output channels CH25, CH26, CH27, and CH28 in an order of the data voltage DATA_R for the first color R, the data voltage DATA_G for the third color G, the data voltage DATA_B for the second color B, and the data voltage DATA_G for the third color G.

In an embodiment, when the seventh arrangement control signal CS[7] has the low voltage level, the seventh output controller 410-7 may output the data voltage having the BGRG arrangement. For example, the seventh output controller 410-7 may apply the data voltages to the twenty-fifth to twenty-eighth output channels CH25, CH26, CH27, and CH28 in an order of the data voltage DATA_B for the second color B, the data voltage DATA_G for the third color G, the data voltage DATA_R for the first color R, and the data voltage DATA_G for the third color G.

As shown in FIG. 12, since the data driver 400 does not have the first fan-out lines FL1 between the third fan-out lines FL3, the sub-pixels SP_R, SP_B and SP_G may output the data voltages as the arrangement in which the sub-pixels SP_R, SP_B, and SP_G are arranged. Accordingly, the output controller 410-5, 410-6, and 410-7 outputting the data voltages to the output channel groups CG[5], CG[6], and CG[7] connected to the third fan-out lines FL3 may output the data voltages according to the same arrangement.

For example, when the fifth arrangement control signal CS[5] has the high voltage level, the sixth and seventh arrangement control signals CS[6] and CS[7] may have the high voltage level. For example, when the fifth arrangement control signal CS[5] has the low voltage level, the sixth and seventh arrangement control signals CS[6] and CS[7] may have the low voltage level.

For example, when the fifth output controller 410-5 outputs the data voltages in the RGBG arrangement, the sixth and seventh output controllers 410-6 and 410-7 may output the data voltages in the RGBG arrangement. For example, when the fifth output controller 410-5 outputs the data voltages in the BGRG arrangement, the sixth and seventh output controllers 410-6 and 410-7 may output the data voltages in the BGRG arrangement.

The control signal generator 420 may control the output controllers 410 by outputting the arrangement control signals CS[5], CS[6], and CS[7] to the output controllers 410. The control signal generator 420 may independently generate the arrangement control signals CS[5], CS[6], and CS[7] for controlling each of the fifth output controller 410-5, the sixth output controller 410-6, and the seventh output controller 410-7. Accordingly, the control signal generator 420 may independently control the output controllers 410.

In this embodiment, it is exemplified that three output channel groups CG[5], CG[6], and CG[7] are connected to the third fan-out lines FL3, but the present inventive concept is not limited thereto.

Figure 13:
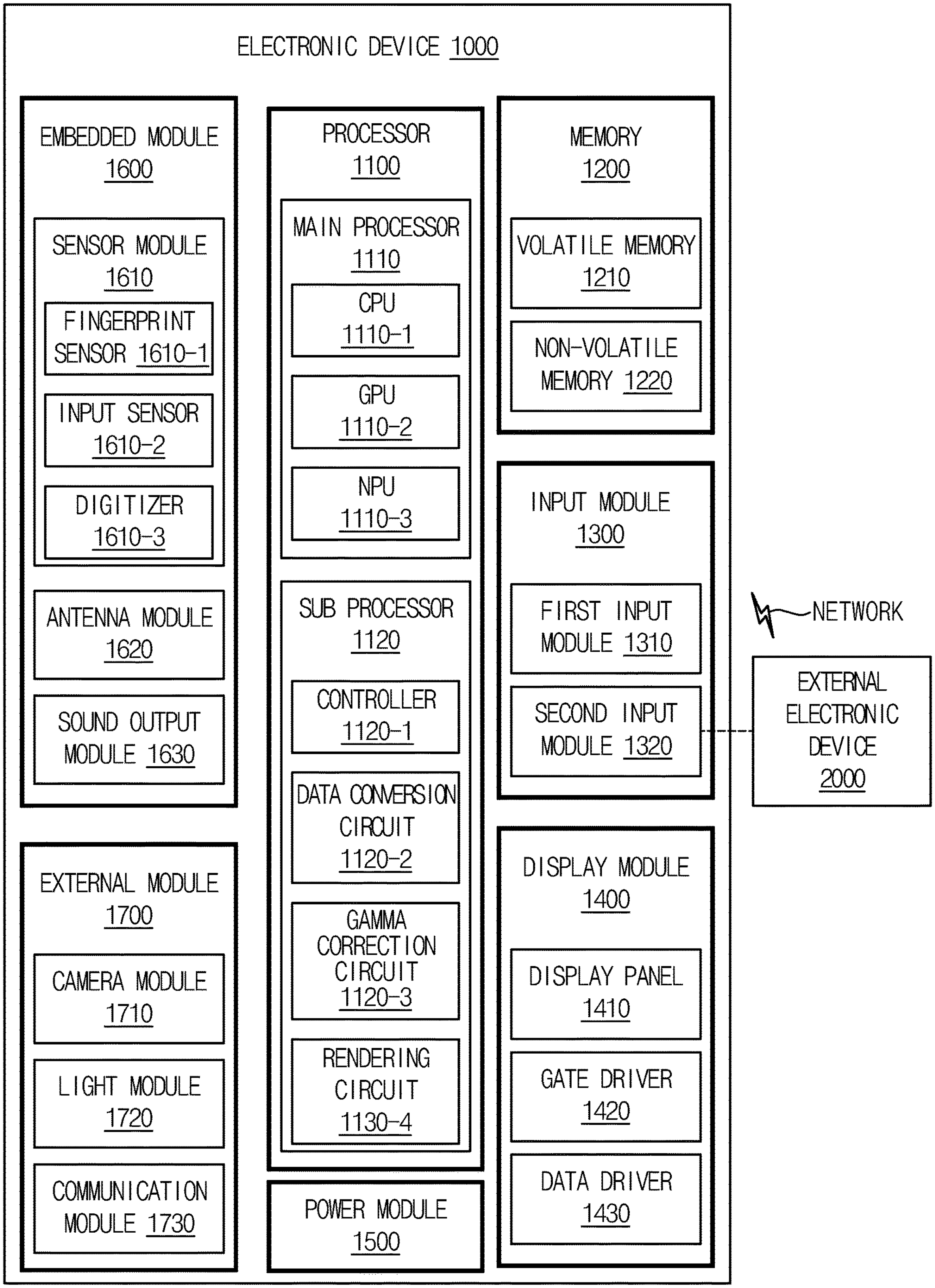
FIG. 13 is a block diagram showing an electronic device according to embodiments of the present inventive concept.
Figure 14:
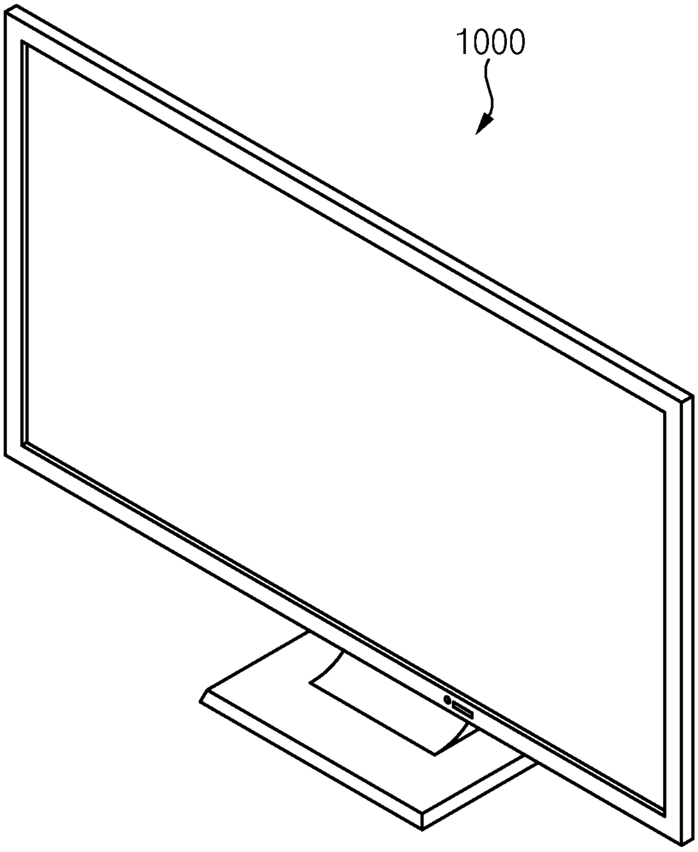
FIG. 14 is a diagram showing an example in which the electronic device of FIG. 13 is implemented as a television.

FIG. 13 is a block diagram showing an electronic device according to embodiments of the present inventive concept, and FIG. 14 is a diagram showing an example in which the electronic device of FIG. 13 is implemented as a television.

Referring to FIGS. 13 and 14, the electronic device 1000 may output various information through a display module 1400 within an operating system. When a processor 1100 executes an application stored in a memory 1200, the display module 1400 may provide application information to a user through the display panel 1410. In this case, the display panel 1410 may be the display panel of FIG. 1.

In an embodiment, as shown in FIG. 14, the electronic device 1000 may be implemented as a television. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1100 may obtain an external input through an input module 1300 or a sensor module 1610 and execute an application corresponding to an external input. In an embodiment, when the user selects a camera icon displayed on the display panel 1410, the processor 1100 may obtain a user input through an input sensor 1610-2 and activate a camera module 1710. The processor 1100 may transmit a data signal corresponding to a photographed image acquired through the camera module 1710 to the display module 1400. The display module 1400 may display an image corresponding to the photographed image through the display panel 1410.

In another embodiment, when personal information authentication is executed in the display module 1400, a fingerprint sensor 1610-1 may obtain input fingerprint information as input data. The processor 1100 may compare the input data acquired through the fingerprint sensor 1610-1 with authentication data stored in the memory 1200, and execute the application according to a comparison result. The display module 1400 may display information executed according to application logic through the display panel 1410.

In another embodiment, when a music streaming icon displayed on the display module 1400 is selected, the processor 1100 may obtain the user input through the input sensor 1610-2 and activate a music streaming application stored in the memory 1200. When a music execution command is input in the music streaming application, the processor 1100 may activate a sound output module 1630 to provide sound information corresponding to the music execution command to the user.

In the above, operation of the electronic device 1000 has been briefly described. Hereinafter, components of the electronic device 1000 will be described in detail. Some of components of the electronic device 1000 described later may be integrated and provided as one component, or one component may be provided separately as two or more components.

The electronic device 1000 may communicate with an external electronic device 2000 through a network (e.g., a short-distance wireless communication network or a long-distance wireless communication network). According to an embodiment, the electronic device 1000 may include the processor 1100, the memory 1200, the input module 1300, the display module 1400, a power module 1500, an embedded module 1600, and an external module 1700. According to an embodiment, in the electronic device 1000, at least one of the above-described components may be omitted or one or more other components may be added. According to an embodiment, some of components (e.g., the sensor module 1610, an antenna module 1620, or the sound output module 1630) may be integrated into another component (e.g., the display module 1400).

The processor 1100 may execute software to control at least one other component (e.g., hardware or software component) of the electronic device 1000 connected to the processor 1100, and perform various data processing or calculations. According to an embodiment, as at least part of the data processing or calculation, the processor 1100 may store commands or data received from other components (e.g., the input module 1300, the sensor module 1610, or the communication module 1730) in a volatile memory 1210, and process the commands or data stored in the volatile memory 1210, and resulting data may be stored in a non-volatile memory 1220.

The processor 1100 may include a main processor 1110 and an sub processor 1120. The main processor 1110 may include one or more of a central processing unit (CPU) 1110-1 or an application processor (AP). The main processor 1110 may further include any one or more of the graphic processing unit (GPU) 1110-2, a communication processor (CP), and an image signal processor (ISP). The main processor 1110 may further include a neural processing unit (NPU) 1110-3. The neural network processing unit may be a processor specialized in processing an artificial intelligence model, and the artificial intelligence model may be generated through machine learning. The artificial intelligence model may include a plurality of artificial neural network layers. Artificial neural networks may include deep neural networks (DNNs), convolutional neural networks (CNNs), recurrent neural networks (RNNs), restricted boltzmann machines (RBMs), deep belief networks (DBNs), bidirectional recurrent deep neural networks (BRDNNs), deep Q-networks or a combination of two or more of the foregoing, but is not limited to the above examples. The artificial intelligence model may include, in addition or alternatively, a software structure in addition to a hardware structure. At least two of the above-described processing unit and processor may be implemented as an integrated component (e.g., a single chip) or each may be implemented as an independent component (e.g., a plurality of chips).

The sub processor 1120 may include a controller 1120-1. The controller 1120-1 may include an interface conversion circuit and a timing control circuit. The controller 1120-1 may receive the input image data from the main processor 1110, convert a data format of the input image data to meet interface specifications with the display module 1400, and output the data signal. The controller 1120-1 may output various control signals necessary for driving the display module 1400.

The sub processor 1120 may further include a data conversion circuit 1120-2, a gamma correction circuit 1120-3, a rendering circuit 1120-4, and the like. The data conversion circuit 1120-2 may receive the data signal from the controller 1120-1 and compensate for the data signal so that an image is displayed with a desired luminance according to characteristics of the electronic device 1000 or a user's setting, or convert the data signal to reduce power consumption or compensate for afterimages. The gamma correction circuit 1120-3 may convert the data signal or the gamma reference voltage so that an image displayed on the electronic device 1000 has desired gamma characteristics. The rendering circuit 1120-4 may receive the data signal from the controller 1120-1 and render the data signal in consideration of a pixel arrangement of the display panel 1410 applied to the electronic device 1000. At least one of the data conversion circuit 1120-2, the gamma correction circuit 1120-3, and the rendering circuit 1120-4 may be integrated into other components (e.g., the main processor 1110 or the controller 1120-1).

At least one of the controller 1120-1, the data conversion circuit 1120-2, the gamma correction circuit 1120-3, and the rendering circuit 1120-4 may be integrated into a data driver 1430 described later.

In this case, the sub processor 1120 may be the timing controller of FIG. 1.

The memory 1200 may store various data used by at least one component (e.g., the processor 1100 or the sensor module 1610) of the electronic device 1000 and input data or output data for commands related the various data. The memory 1200 may include at least one of the volatile memory 1210 and the non-volatile memory 1220.

The input module 1300 may receive commands or data to be used for components (e.g., the processor 1100, the sensor module 1610 or the sound output module 1630) of the electronic device 1000 from outside the electronic device 1000 (e.g., the user or the external electronic device 2000).

The input module 1300 may include a first input module 1310 into which the command or data is input from the user and a second input module 1320 into which the command or data is input from the external electronic device 2000. The first input module 1310 may include a microphone, a mouse, a keyboard, a key (e.g., a button), or a pen (e.g., a passive pen or an active pen). The second input module 1320 may support a designated protocol capable of connecting to the external electronic device 2000 by wire or wirelessly. According to an embodiment, the second input module 1320 may include a high definition multimedia interface (HDMI), a universal serial bus (USB) interface, an SD card interface, or an audio interface. The second input module 1320 may include a connector that can be physically connected to the external electronic device 2000, for example, an HDMI connector, a USB connector, an SD card connector, or an audio connector (e.g., a headphone connector).

The display module 1400 may visually provide information to the user. The display module 1400 may include the display panel 1410, the gate driver 1420, and the data driver 1430. The display module 1400 may further include a window, a chassis, and a bracket to protect the display panel 1410. In this case, the gate driver 1420 and the data driver 1430 may be the gate driver and data driver of FIG. 1.

The display panel 1410 may include a liquid crystal display panel, an organic light emitting display panel, or an inorganic light emitting display panel, and the type of display panel 1410 is not particularly limited. The display panel 1410 may be a rigid type or a flexible type capable of being rolled or folded. The display module 1400 may further include a supporter, a bracket, or a heat dissipation member that supports the display panel 1410.

The gate driver 1420 may be mounted on the display panel 1410 as a driving chip. Also, the gate driver 1420 may be integrated into the display panel 1410. For example, the gate driver 1420 may include an amorphous silicon TFT gate driver circuit (ASG), a low temperature polycrystalline silicon (LTPS) TFT gate driver circuit, or an oxide semiconductor TFT gate driver circuit (OS G) formed at the same time with the display panel forming elements (e.g., light emitting elements, transistors, etc.) in the display panel 1410. The gate driver 1420 may receive a control signal from the controller 1120-1 and output the gate signals to the display panel 1410 in response to the control signal.

The display panel 1410 may further include an emission driver. The emission driver may output an emission signal to the display panel 1410 in response to the control signal received from the controller 1120-1. The emission driver may be formed separately from the gate driver 1420 or integrated into the gate driver 1420.

The data driver 1430 may receive a control signal from the controller 1120-1, convert the data signal into an analog voltage (e.g., the data voltage) in response to the control signal, and then output the data voltages to the display panel 1410.

The data driver 1430 may be integrated into other components (e.g., the controller 1120-1). The functions of the interface conversion circuit and the timing control circuit of the controller 1120-1 described above may be integrated into the data driver 1430.

The display module 1400 may further include a light driver and a voltage generating circuit. The voltage generating circuit may output various voltages necessary for driving the display panel 1410.

The power module 1500 may supply power to components of the electronic device 1000. The power module 1500 may include a battery that charges a power voltage. A battery may include a non-rechargeable primary cell, a rechargeable secondary cell or a fuel cell. The power module 1500 may include a power management integrated circuit (PMIC). The PMIC may supply optimized power to each of the above-described modules and modules described later. The power module 1500 may include a wireless power transmission/reception member electrically connected to the battery. The wireless power transmission/reception member may include a plurality of antenna radiators in the form of coils.

The electronic device 1000 may further include the embedded module 1600 and the external module 1700. The embedded module 1600 may include the sensor module 1610, the antenna module 1620, and the sound output module 1630. The external module 1700 may include the camera module 1710, a light module 1720, and the communication module 1730.

The sensor module 1610 may detect an input by a user's body or an input by a pen among the first input module 1310, and generate an electrical signal or data value corresponding to the input. The sensor module 1610 may include at least one of the fingerprint sensor 1610-1, the input sensor 1610-2, and a digitizer 1610-3.

The fingerprint sensor 1610-1 may generate a data value corresponding to the user's fingerprint. The fingerprint sensor 1610-1 may include either an optical or capacitive fingerprint sensor.

The input sensor 1610-2 may generate data values corresponding to coordinate information of an input by a user's body or a pen. The input sensor 1610-2 may generate a capacitance change due to the input as the data value. The input sensor 1610-2 may detect the input by the passive pen or transmit/receive data to/from the active pen.

The input sensor 1610-2 may measure a biosignal such as blood pressure, moisture, or body fat. For example, when the user touches a part of his body to a sensor layer or sensing panel and does not move for a certain period of time, the input sensor 1610-2 may detect the biosignal based on a change in electric field caused by the part of the user's body. Information desired by the user may be output to the display module 1400.

The digitizer 1610-3 may generate data values corresponding to coordinate information input by the pen. The digitizer 1610-3 may generate the amount of electromagnetic change by the input as the data value. The digitizer 1610-3 may detect the input by the passive pen or transmit/receive data to/from the active pen.

At least one of the fingerprint sensor 1610-1, the input sensor 1610-2, and the digitizer 1610-3 may be implemented as the sensor layer formed on the display panel 1410 through a continuous process. The fingerprint sensor 1610-1, the input sensor 1610-2, and the digitizer 1610-3 may be disposed above the display panel 1410, and any one of the fingerprint sensor 1610-1, the input sensor 1610-2, and the digitizer 1610-3, for example, the digitizer 1610-3 may be disposed below the display panel 1410.

At least two or more of the fingerprint sensor 1610-1, the input sensor 1610-2, and the digitizer 1610-3 may be integrated into one sensing panel through the same process. When integrated into one sensing panel, the sensing panel may be disposed between the display panel 1410 and the window disposed above the display panel 1410. According to an embodiment, the sensing panel may be disposed on the window, and the location of the sensing panel is not particularly limited.

At least one of the fingerprint sensor 1610-1, the input sensor 1610-2, and the digitizer 1610-3 may be embedded in the display panel 1410. That is, at least one of the fingerprint sensor 1610-1, the input sensor 1610-2, and the digitizer 1610-3 may be simultaneously formed through a process of forming elements (e.g., light emitting elements, transistors, etc.) included in the display panel 1410.

In addition, the sensor module 1610 may generate an electrical signal or data value corresponding to an internal state or an external state of the electronic device 1000. The sensor module 1610 may be further included, for example, a gesture sensor, a gyro sensor, a barometric pressure sensor, a magnetic sensor, an acceleration sensor, a grip sensor, a proximity sensor, a color sensor, an infrared (IR) sensor, a biosensor, a temperature sensor, a humidity sensor, or an illuminance sensor.

The antenna module 1620 may include one or more antennas for transmitting or receiving signals or power to the outside. According to an embodiment, the communication module 1730 may transmit a signal to an external electronic device or receive a signal from an external electronic device through an antenna suitable for a communication method. The antenna pattern of the antenna module 1620 may be integrated into one component of the display module 1400 (e.g., the display panel 1410) or the input sensor 1610-2.

The sound output module 1630 may be a device for outputting a sound signal to the outside of the electronic device 1000, and include, for example, a speaker used for general purposes such as multimedia playback or recording playback and a receiver used exclusively for receiving calls. According to an embodiment, the receiver may be formed integrally with or separately from the speaker. A sound output pattern of the sound output module 1630 may be integrated with the display module 1400.

The camera module 1710 may capture still images and moving images. According to an embodiment, the camera module 1710 may include one or more lenses, image sensors, or image signal processors. The camera module 1710 may further include an infrared camera capable of measuring the presence or absence of the user, the user's location, and the user's line of sight.

The light module 1720 may provide light. The light module 1720 may include a light emitting diode or a xenon lamp. The light module 1720 may operate in conjunction with the camera module 1710 or operate independently.

The communication module 1730 may support establishing a wired or wireless communication channel between the electronic device 1000 and the external electronic device 2000 and performing communication through the established communication channel. The communication module 1730 may include one or all of be a wireless communication module such as a cellular communication module, a short-range wireless communication module, or a global navigation satellite system (GNSS) communication module, and a wired communication module such as a local area network (LAN) communication module or a power line communication module. The communication module 1730 may communicate with the external electronic device 2000 through a short-range communication network such as Bluetooth, WiFi direct, or infrared data association (IrDA) or a long-distance communication network such as a cellular network, the Internet, or a computer network (e.g., LAN or WAN). The various types of communication modules 1730 described above may be implemented as a single chip or may be implemented as separate chips.

The input module 1300, the sensor module 1610, the camera module 1710, and the like may be used to control the operation of the display module 1400 in conjunction with the processor 1100.

The processor 1100 may output commands or data to the display module 1400, the sound output module 1630, the camera module 1710, or the light module 1720 based on input data received from the input module 1300. For example, the processor 1100 may generate a data signal corresponding to input data applied through the mouse or the active pen and output the data signal to the display module 1400 or generate command data corresponding to input data and output the command data to the camera module 1710 or the light module 1720. When the input data is not received from the input module 1300 for a certain period of time, the processor 1100 may convert an operation mode of the electronic device 1000 into a low power mode or a sleep mode to reduce power consumption.

The processor 1100 may output commands or data to the display module 1400, the sound output module 1630, the camera module 1710, or the light module 1720 based on sensing data received from the sensor module 1610. For example, the processor 1100 may compare authentication data applied by the fingerprint sensor 1610-1 with authentication data stored in the memory 1200, and then execute an application according to the comparison result. The processor 1100 may execute a command or output a corresponding data signal to the display module 1400 based on the sensing data sensed by the input sensor 1610-2 or the digitizer 1610-3. When the sensor module 1610 includes a temperature sensor, the processor 1100 may receive temperature data about the temperature measured from the sensor module 1610 and further perform luminance correction on the data signal based on the temperature data.

The processor 1100 may receive measurement data about the presence or absence of the user, the user's location, and the user's gaze from the camera module 1710. The processor 1100 may further perform luminance correction on the data signal based on the measurement data. For example, the processor 1100 that determines whether or not there is the user through an input from the camera module 1710 may output a data signal whose luminance is corrected through the data conversion circuit 1120-2 or the gamma correction circuit 1120-3 to the display module 1400.

Some of the components may be connected to each other through communication method such as a bus, general purpose input/output (GPIO), serial peripheral interface (SPI), mobile industry processor interface (MIPI), or ultra path interconnect (UPI) link between peripheral devices to exchange signals (e.g., commands or data) with each other. For example, any one of the above-described communication methods may be used, and is not limited to the above-described communication method.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A data driver comprising:

output channels configured to output data signals;

output controllers configured to selectively output data signals having a first arrangement or data signals having a second arrangement to output channel groups each of which includes N output channels in response to arrangement control signals, where N is a positive integer greater than or equal to 2; and a control signal generator configured to output the arrangement control signals to the output controllers to control the output controllers, wherein a first output controller among the output controllers is configured to selectively output data signals for a first color to a first output channel or a third output channel in response to one of the arrangement control signals;

wherein the first output controller is configured to selectively output data signals for a second color to the first output channel or the third output channel in response to the one of the arrangement signals; and wherein the first output controller is configured to output data signals for a third color to a second output channel and a fourth output channel.

2. The data driver of claim 1, wherein the control signal generator is configured to independently control the output controllers.

3. The data driver of claim 1, wherein the first color is a red, the second color is a blue, and the third color is a green.

4. The data driver of claim 1, wherein the first arrangement and the second arrangement include a first color, a second color, and a third color, wherein the first arrangement is an arrangement of an order of the first color, the third color, the second color, and the third color, and wherein the second arrangement is an arrangement of an order of the second color, the third color, the first color, and the third color.

5. An electronic device comprising:

a display module;

a sub processor configured to control the display module; and a main processor configured to supply input image data to the sub processor, wherein the display module includes:

a display panel including a display region including a first display region, a second display region disposed adjacent to the first display region, and a third display region disposed adjacent to the second display region, sub-pixels, fan-out lines which include a first fan-out lines, a second fan-out lines, and a third fan-out lines; and a data driver configured to output data signals to data lines through the first to third fan-out lines, wherein the first fan-out lines are connected to the data lines connected to the sub-pixels disposed in the first display region, wherein the second fan-out lines are connected to the data lines connected to the sub-pixels disposed in the second display region, wherein the third fan-out lines are connected to the data lines connected to the sub-pixels disposed in the third display region, and wherein the data driver includes:

output channels configured to output the data signals;

output controllers configured to selectively output data signals having a first arrangement or data signals having a second arrangement to output channel groups each of which includes N output channels in response to arrangement control signals, where N is a positive integer greater than or equal to 2; and a control signal generator configured to output the arrangement control signals to the output controllers to control the output controllers.

6. The electronic device of claim 5, wherein groups of the first fan-out lines and groups of the second fan-out lines are alternately arranged in a peripheral region of the display panel, and wherein each of the groups of the first fan-out lines and the groups of the second fan-out lines includes M fan-out lines, where M is a positive integer greater than or equal to 2.

7. The electronic device of claim 6, wherein groups of the output channels connected to the first fan-out lines and groups of the output channels connected to the second fan-out lines are alternately arranged in a peripheral region of the display panel, and wherein each of the groups of the output channels connected to the first fan-out lines and the groups of the output channels connected to the second fan-out lines includes M output channels, where M is a positive integer greater than or equal to 2.

8. The electronic device of claim 7, wherein the N is an integer multiple of the M.

9. The electronic device of claim 5, wherein the data lines include data lines connected to first color sub-pixels displaying a first color and second color sub-pixels displaying a second color.

10. The electronic device of claim 9, wherein the output controllers are configured to output the data signals having the second arrangement after outputting the data signals having the first arrangement, and wherein the output controllers are configured to output the data signals having the first arrangement after outputting the data signals having the second arrangement.

11. The electronic device of claim 5, wherein the output controllers includes a first output controller and a second output controller disposed adjacent to the first output controller, wherein the first output controller and the second output controller are configured to output the data signals to the output channel groups connected to the first fan-out lines and the second fan-out lines, wherein the second output controller is configured to output data signals having the second arrangement when the first output controller outputs data signals having the first arrangement, and wherein the second output controller is configured to output data signals having the first arrangement when the first output controller outputs data signals having the second arrangement.

12. The electronic device of claim 5, wherein output controllers connected to the third fan-out lines are configured to output data signals having a same arrangement.

13. The electronic device of claim 5, wherein the control signal generator is configured to independently control the output controllers.

14. The electronic device of claim 5, wherein a first output controller among the output controllers is configured to selectively output data signals for a first color to a first output channel or a third output channel in response to one of the arrangement control signals;

wherein the first output controller is configured to selectively output data signals for a second color to the first output channel or the third output channel in response to the one of the arrangement signals; and wherein the first output controller is configured to output data signals for a third color to a second output channel and a fourth output channel.

15. The electronic device of claim 14, wherein the first color is a red, the second color is a blue, and the third color is a green.

16. The electronic device of claim 5, wherein the first arrangement and the second arrangement include a first color, a second color, and a third color, wherein the first arrangement is an arrangement of an order of the first color, the third color, the second color, and the third color, and wherein the second arrangement is an arrangement of an order of the second color, the third color, the first color, and the third color.

17. The electronic device of claim 5, wherein each of the first fan-out lines is connected to a corresponding data line via the display region.

18. A display device comprising:

a display panel including a display region including a first display region, a second display region disposed adjacent to the first display region, and a third display region disposed adjacent to the second display region, sub-pixels, fan-out lines which include a first fan-out lines, a second fan-out lines, and a third fan-out lines;

a data driver configured to output data signals to data lines through the first to third fan-out lines; and a timing controller configured to control the data driver, wherein the first fan-out lines are connected to the data lines connected to the sub-pixels disposed in the first display region via the display region, wherein the second fan-out lines are connected to the data lines connected to the sub-pixels disposed in the second display region, wherein the third fan-out lines are connected to the data lines connected to the sub-pixels disposed in the third display region, wherein the sub-pixels of a first pixel row are configured to receive data signals having a first arrangement, wherein the sub-pixels of a second pixel row disposed adjacent to the first pixel row are configured to receive data signals having a second arrangement different from the first arrangement;

wherein the data driver is configured to output data signals having a third arrangement in which the second arrangement follows the first arrangement or the data signals having a fourth arrangement in which the first arrangement follows the second arrangement to the first fan-out lines and the second fan-out lines.

19. The display device of claim 18, wherein the data driver includes:

output channels configured to output the data signals;

output controllers configured to selectively output data signals having a the first arrangement or data signals having the second arrangement to output channel groups each of which includes N output channels in response to arrangement control signals, where N is a positive integer greater than or equal to 2; and a control signal generator configured to output the arrangement control signals to the output controllers to control the output controllers.

* * * * *